United States Patent
Yoneshima

(10) Patent No.: US 12,151,458 B2
(45) Date of Patent: Nov. 26, 2024

(54) LAMINATE, METHOD FOR MANUFACTURING INTERMEDIATE SHEET, AND METHOD FOR MANUFACTURING COMPOSITE

(71) Applicant: Yoneshimafelt Co., Ltd., Osaka (JP)

(72) Inventor: Tomoya Yoneshima, Osaka (JP)

(73) Assignee: YONESHIMAFELT CO., LTD., Osaka (JP)

( * ) Notice: Subject to any disclaimer, the term of this patent is extended or adjusted under 35 U.S.C. 154(b) by 0 days.

(21) Appl. No.: 17/558,650

(22) Filed: Dec. 22, 2021

(65) Prior Publication Data
US 2022/0118733 A1  Apr. 21, 2022

Related U.S. Application Data

(63) Continuation of application No. PCT/JP2021/005898, filed on Feb. 17, 2021.

(30) Foreign Application Priority Data

Feb. 17, 2020 (JP) .................................. 2020-024756

(51) Int. Cl.
B32B 3/12      (2006.01)
B32B 7/12      (2006.01)
(Continued)

(52) U.S. Cl.
CPC ................ B32B 3/12 (2013.01); B32B 7/12 (2013.01); B32B 21/08 (2013.01); B32B 21/10 (2013.01);
(Continued)

(58) Field of Classification Search
None
See application file for complete search history.

(56) References Cited

U.S. PATENT DOCUMENTS 5,380,392 A    1/1995  Imamura et al.
6,059,913 A *  5/2000  Asmussen ............ A61K 9/7061
                                                156/289

(Continued)

FOREIGN PATENT DOCUMENTS

CN     105153956 A    12/2015
DE     69129972 T2    2/1999
(Continued)

OTHER PUBLICATIONS

International Search Report issued in PCT/JP2021/005898 mailed on Apr. 20, 2021 with English Translation (7 pages).
(Continued)

*Primary Examiner* — Barbara J Musser
(74) *Attorney, Agent, or Firm* — PEARNE & GORDON LLP

(57) ABSTRACT

In order to provide a composite good in formability into a three-dimensional shape and easy to manufacture, in a laminate having a core material layer and a skin material laminated on the core material layer, the core material layer has a plurality of plate-shaped flakes lined up along a surface of the skin material, and adjacent plate-shaped flakes are separated from each other by a gap or by a cut in the core material layer, and cutting directions along a thickness direction, which is determined from cutting marks formed on an outer periphery, are identical to each other among the plurality of the plate-shaped flakes.

7 Claims, 16 Drawing Sheets

(51) Int. Cl.
*B32B 21/08* (2006.01)
*B32B 21/10* (2006.01)
*B32B 27/12* (2006.01)
*B32B 37/00* (2006.01)
*B32B 37/12* (2006.01)
*B32B 37/22* (2006.01)
*B32B 37/26* (2006.01)
*B32B 38/00* (2006.01)

(52) U.S. Cl.
CPC ............ *B32B 27/12* (2013.01); *B32B 37/025* (2013.01); *B32B 37/12* (2013.01); *B32B 37/226* (2013.01); *B32B 37/26* (2013.01); *B32B 38/0004* (2013.01); *B32B 2250/03* (2013.01); *B32B 2250/04* (2013.01); *B32B 2305/076* (2013.01)

(56) References Cited

U.S. PATENT DOCUMENTS

| | | | |
|---|---|---|---|
| 2003/0218278 A1* | 11/2003 | Tait | B23K 26/38 |
| | | | 264/2.7 |
| 2008/0113143 A1* | 5/2008 | Taylor | B32B 5/32 |
| | | | 428/47 |
| 2013/0209735 A1 | 8/2013 | Kim et al. | |
| 2018/0194917 A1 | 7/2018 | Dikeman et al. | |
| 2019/0001735 A1* | 1/2019 | Cathomen | B42D 25/455 |
| 2019/0099964 A1 | 4/2019 | Streuber | |

FOREIGN PATENT DOCUMENTS

| | | |
|---|---|---|
| DE | 102005063147 A1 | 7/2006 |
| EP | 1398143 A1 | 3/2004 |
| JP | H2-206536 A | 8/1990 |
| JP | H5-52080 U | 7/1993 |
| JP | 3017047 U | 10/1995 |
| JP | H8-112873 A | 5/1996 |
| JP | H11-78874 A | 3/1999 |
| JP | H11-151772 A | 6/1999 |
| JP | 2007-138014 A | 6/2007 |
| JP | 5151535 B2 | 2/2013 |

OTHER PUBLICATIONS

Extended European search report issued in European Patent Application No. 21756550.6 dated Jun. 19, 2023.

* cited by examiner

Fig. 14
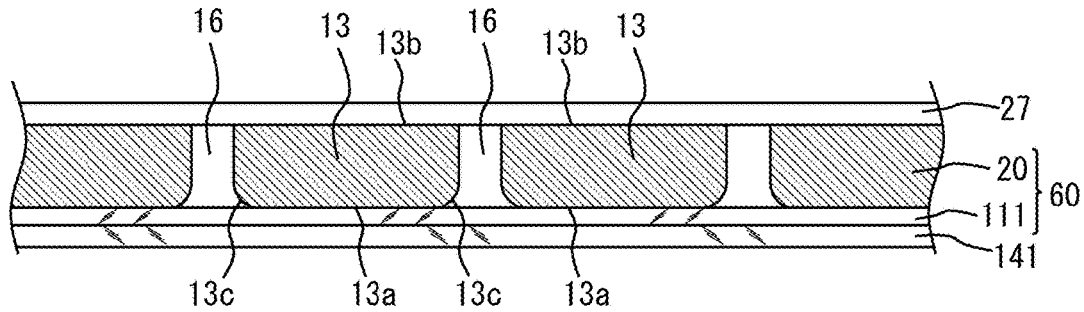
Fig. 15
(a)
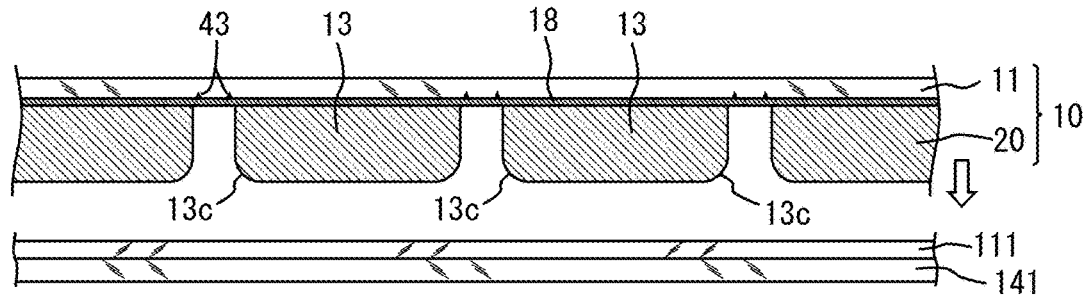
(b)
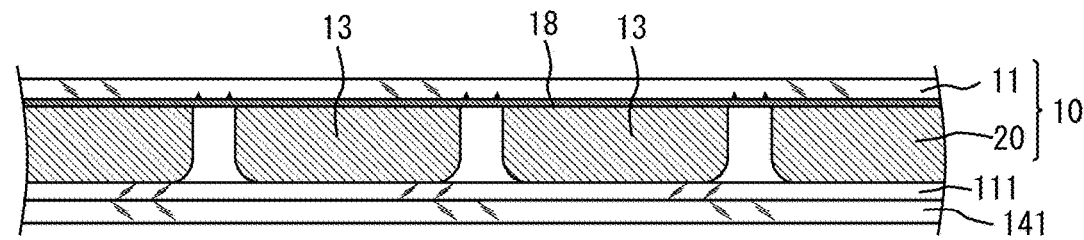
(c)
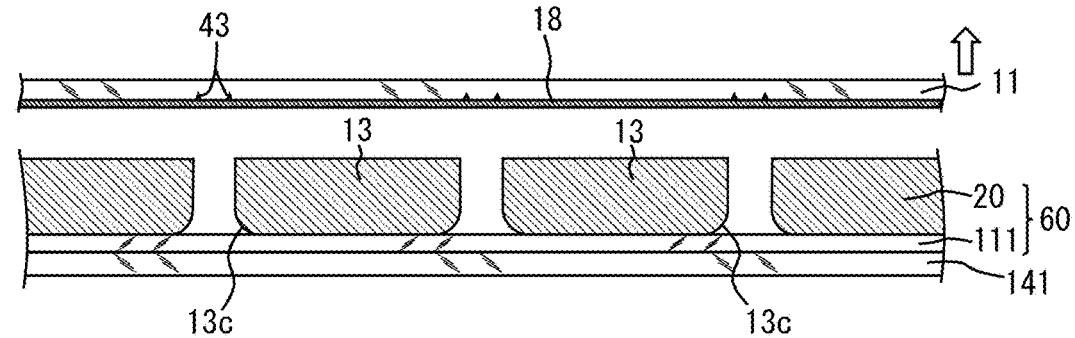

LAMINATE, METHOD FOR MANUFACTURING INTERMEDIATE SHEET, AND METHOD FOR MANUFACTURING COMPOSITE

TECHNICAL FIELD

The present disclosure relates to a composite having a core material layer, and the like.

BACKGROUND ART

The general feature of a structural material forming a so-called sandwich structure (see, for example, Patent Document 1 and Patent Document 2) is light weight and high rigidity. The essence of this feature is that the rigidity per density is high. When bending stresses occur in the composite, the stress burden in the skin material is high, while the stress burden in the core material is relatively low, and therefore, the core material of a core layer is made of a material with low density and somewhat high rigidity.

As a light-weight structural material made of a single material, a type of structural material known as an I-beam is provided, and this I-beam is used, for example, as a beam for architectural structures. The I-beam consists of wide flanges (plate materials) vertically placed opposite to each other, and a narrow web (plate material) that connects these flanges, and is widely used as a structure that allows both light weight and high rigidity to be realized by a single material. Both the sandwich structure and I-beam structure can be made exponentially more rigid by increasing the thickness of the plate materials.

Sandwich-structured composites are typically used for wall materials of a prefabricated house. In this case, for example, aluminum sheets are used as a skin material and expanded polystyrene is used as a core material. Sandwich-structured composites are also used for aircraft and railroad cars and the like. In this case, for example, fiber-reinforced plastic material (FRP) is used as a skin material, and a honeycomb structure member made of aluminum or resin-impregnated aramid paper is used as a core material. A sandwich-structured composite is also used for a packaging box. In this case, for example, the skin material is made of paper and the core material is made of the same paper. A truss structure formed in a waveform is used for the core material.

Since a sandwich-structured core material is smaller in density than the skin material, the thickness of the core material is increased by the weight reduction of the core material, and as a result, the specific rigidity (rigidity per specific gravity (density)) of the sandwich structure can be increased to allow the light weight and high rigidity to be achieved. It is known that the bending rigidity of a structural material increases exponentially with the increase in thickness in the bending direction of its cross-section, and in the case of a rectangular cross-section, the bending rigidity increases in proportion to the cube of the thickness. If in the sandwich structure, the core material is lower in density than the skin material, the specific rigidity increases even if resin foam is not adopted as the core material. This is true no matter what kind of material is employed as the core material, such as metal or wood material. This is because, in general, in the case of considering the bending rigidity of structural materials, the part closer to the center with respect to thickness against the bending direction has less bending strain and contributes less to the rigidity of the structural material. Therefore, to reduce the density of this center part is beneficial to reducing the weight with the state where the rigidity is secured.

Here, FIG. 9 of Patent Document 1 discloses a sandwich structure object consisting of a core material, fiber-reinforced materials placed on both sides of the core material, and an island-like structure of the core material. The core material is obtained by subjecting a film made by press-molding polypropylene resin to punching-out processing to make disc-shaped plates and then arranging the disc-shaped plates so that they have a predetermined spacing.

Additionally, Patent Document 2 discloses a reinforcing structure made of a sheet-shaped base material. This reinforcing structure has material attenuations that sub-divide the base material into a multitude of material islands. The material islands are delineated from each other by the material attenuations but are still connected to each other.

REFERENCE DOCUMENT OF CONVENTIONAL ART

Patent Document

[Patent Document 1] U.S. Pat. No. 5,151,535
[Patent Document 2] U.S. Patent Application Publication No. 2019/0099964A1

DESCRIPTION OF THE DISCLOSURE

Problems to be Solved by the Disclosure

By the way, in the sandwich-structured body described in Patent Document 1, a large number of disk-shaped plates which are created by punching-out processing are individually placed on a fiber-reinforced material in order to provide the island-like structure of the core material on the fiber-reinforced material. However, it is not easy to place the disks individually.

On the other hand, since in the reinforcing structure described in Patent Document 2, a multitude of material islands are connected to each other to be integrated, it is relatively easy to laminate a reinforcing structure to a cover layer. However, since connection portions are present between material islands in the case of molding a composite in a three-dimensional shape, the range in which to bend the reinforcing structure is restricted. Additionally, in the case where a composite is molded in a complicated three-dimensional shape, no room is present for releasing the strain of each material island, and therefore, the periphery of the connection portion may be damaged. With the reinforcing structure described in Patent Document 2, it is difficult to provide a composite that is good in formability into three-dimensional shapes, as the need for composite increases.

The disclosure is made in view of the foregoing circumstances, and one purpose thereof is to provide a composite that is good in formability into a three-dimensional shape and is easy to manufacture.

SUMMARY OF THE DISCLOSURE

In response to the above issue, the inventor of the present application thought of a method of manufacturing a composite. the method includes a step of obtaining an intermediate sheet in which a plurality of plate-shaped flakes is attached to a base sheet by cutting a material sheet, which is the basis for the plurality of plate-shaped flakes, in a state of being attached to the base sheet and a step of manufacturing a composite using the intermediate sheet as a transfer sheet, an adhering core material sheet, or a sheet for manufacturing composites, these sheets are described below. As a composite or an intermediate sheet obtained by this manufacturing method, the first aspect is a laminate comprising a core material layer and a skin material laminated on the core material layer, wherein: the core material layer has a plurality of plate-shaped flakes lined up along a surface of the skin material; adjacent plate-shaped flakes are separate from each other by a gap or by a cut in the core material layer; and among the plurality of plate-shaped flakes, cutting directions along a thickness direction, which is determined from cutting marks formed on an outer periphery of each of the plurality of plate-shaped flakes, are identical to each other. In this description, "an intermediate sheet (intermediate material)" refers to a sheet that is produced in an intermediate process in a manufacturing process of a composite. Further, the "core material layer" is a member that forms a sandwich-structured central layer. However, in the laminate before the composite is formed, a member corresponding to the central layer in the composite after being formed is referred to as the "core material layer," even if the laminate has a canapé structure.

According to the second aspect of the present disclosure, in the first aspect, wherein in the core material layer, the ratio of the total area of the plate-shaped flakes to the whole area in a plan view is 50% or more.

According to the third aspect of the present disclosure, in the first or second aspect, wherein in the skin material laminated on a main surface, out of main surfaces of the plate-shaped flakes, which is located on a progressive side of cutting as the cutting directions along the thickness direction, a cutting scratch which would be formed if the plurality of plate-shaped flakes was formed on the skin material by a process of the cutting is not present on a surface of the core material layer side of the skin material.

According to the fourth aspect of the present disclosure, in any one of the first to third aspects, wherein each of the plurality of plate-shaped flakes is made of a rigid foam.

According to the fifth aspect of the present disclosure, in any one of the first to third aspects, wherein each of the plurality of plate-shaped flakes is made of a wood material.

According to the sixth aspect of the present disclosure, in any one of the first to fifth aspects, wherein the laminate has the skin material as a first skin material, the laminate further comprising: a second skin material disposed on an opposite side of the core material layer to the first skin material, and interposing the core material layer together with the first skin material.

According to the seventh aspect of the present disclosure, in the sixth aspect, wherein the laminate has the core material layer as a first core material layer, the laminate further comprising: a second core material layer having a plurality of plate-shaped flakes lined up along a surface of the second skin material; and an adhesive interlayer disposed between the first core material layer and the second core material layer to adhere the first core material layer and the second core material layer, wherein the first skin material, the first core material layer, the adhesive interlayer, the second core material layer, and the second skin material are laminated in this order.

According to the eighth aspect of the present disclosure, in the seventh aspect, wherein the adhesive interlayer is formed of a sheet-shaped adhesive.

According to the ninth aspect of the present disclosure, in any one of the first to eighth aspects, wherein the adhesive interlayer is formed of a sheet-shaped adhesive.

According to the tenth aspect of the present disclosure, in any one of the sixth to ninth aspects, wherein a gap between the adjacent plate-shaped flakes is filled with cured resin.

According to the eleventh aspect of the present disclosure, in any one of the first to fifth aspects, wherein the skin material is a sheet-shaped adhesive.

According to the twelfth aspect of the present disclosure, in any one of the first to fifth aspects, wherein the skin material is a prepreg in a semi-cured state.

According to the thirteenth aspect of the present disclosure, in the first, second, fourth or fifth aspect, wherein the plurality of plate-shaped flakes is peelably attached to the skin material and used as a transfer sheet being able to transfer the plurality of plate-shaped flakes from the skin material to another structural material.

According to the fourteenth aspect of the present disclosure, in the thirteenth aspect, wherein the plurality of plate-shaped flakes is attached to the skin material by means of a pressure-sensitive adhesive with temperature susceptibility.

According to the fifteenth aspect of the present disclosure, in any one of the first to thirteenth aspects, wherein a pressure-sensitive adhesive layer or an adhesive layer which holds the position of the plate-shaped flakes is provided between the skin material and the plate-shaped flakes.

According to the sixteenth aspect of the present disclosure, in any one of the first to fifteenth aspects, wherein a compartment space of a through hole is formed in the plate-shaped flake.

A seventeenth aspect is a method for manufacturing an intermediate sheet in which a plurality of plate-shaped flakes is attached, the plurality of plate-shaped flakes is used for a core material of a composite, the method comprising: a cutting step of cutting a material sheet, in a state of being attached to a base sheet, to divide the material sheet into a plurality of plate-shaped flakes and obtain the intermediate sheet in which the plurality of plate-shaped flakes is attached to the base sheet; and wherein the intermediate sheet is used as a transfer sheet, wherein the plurality of plate-shaped flakes is transferred from the base sheet to another structural material, or an adhering core material sheet, wherein the base sheet is allowed to be melted in a state of being laminated a skin material sheet which is for a skin sheet of the composite in using the base sheet as an adhesive.

According to the eighteenth aspect of the present disclosure, in the seventeenth aspect, the method comprising: an attaching step of attaching a sheet-shaped adhesive or a prepreg as a skin material of the intermediate sheet, to the plate-shaped flake side of the transfer sheet, and a transfer step of transferring, after the attaching step, the plurality of plate-shaped flakes to the skin material of the intermediate sheet by peeling off the base sheet from the plurality of plate-shaped flakes.

A nineteenth aspect is a method for manufacturing a composite, the method comprising: an attaching step of attaching the skin material sheet, which is for the skin sheet of the composite, to the plate-shaped flake side of the transfer sheet obtained by the manufacturing method according to the seventeenth aspect, and a transfer step of transferring, after the attaching step, the plurality of plate-shaped flakes to the skin material sheet by peeling off the base sheet from the plurality of plate-shaped flakes.

According to the twentieth aspect of the present disclosure, in the nineteenth aspect, wherein: an elastic sheet is used for the skin material; and in the transfer step, the plate-shaped flakes are transferred by pressing a plate-shaped flake of transfer target from a back side of the base sheet while pulling the base sheet.

According to the twenty-first aspect of the present disclosure, in the twentieth aspect, the method further comprising: a lamination step of interposing, after the transfer step, the plurality of plate-shaped flakes between the skin material sheet and a second skin material sheet; and a honeycomb formation step of forming a honeycomb structure made of resin in a core material layer, including the plurality of plate-shaped flakes, by making resin flow into a gap in the core material layer to cure the resin.

Effect of the Disclosure

In the present disclosure, among the plurality of plate-shaped flakes in the case where a laminate is an intermediate sheet, cutting directions along the thickness direction, which is determined from cutting marks formed on an outer periphery as a trace of forming the plurality of plate-shaped flakes by performing a cutting process on a skin material (e.g., a base sheet), are identical to each other. The plurality of plate-shaped flakes is formed on the skin material of the intermediate sheet in accordance with the plan-view cutting shape in the cutting process.

Additionally, among the plurality of plate-shaped flakes in the case where a laminate is a composite, cutting directions along the thickness direction, which is determined from cutting marks formed on an outer periphery as a trace of being manufactured using the above-mentioned intermediate sheet, are identical to each other. The plurality of plate-shaped flakes is arranged on the skin material of the composite in accordance with the arrangement of the plate-shaped flakes in the intermediate sheet. Therefore, it is not necessary to arrange the plurality of plate-shaped flakes individually on the material of the skin material (e.g., a skin material sheet), and the core material layer in which the plurality of plate-shaped flakes is arranged can be easily formed.

In addition, since adjacent plate-shaped flakes are separated from each other by a gap or by a cut, they are less restricted in the range in which the core material layer can be bent on the occasion of forming the composite in a three-dimensional shape, as compared with a composite wherein a plurality of material islands is connected to each other, and are excellent in formability into a three-dimensional shape. The present disclosure allows a composite excellent in formability into a three-dimensional shape and easy to manufacture, to be provided.

BRIEF DESCRIPTION OF DRAWINGS

FIG. 14 shows a cross-sectional view of an adhesive core material sheet according to a third variation.

FIG. 15 shows a cross-sectional view to explain a transfer step in the manufacturing process of an adhesive core material sheet according to the third variation.

MODE FOR CARRYING OUT THE DISCLOSURE

Hereinafter, one embodiment of the present disclosure is described in detail with reference to Figures. Note that the embodiment below is one example composite etc. of the present disclosure, and is not intended to limit the scope of the present disclosure, articles to which the present disclosure is applicable, or a use of the present disclosure.

[Configuration of Composite]

Figure 1:
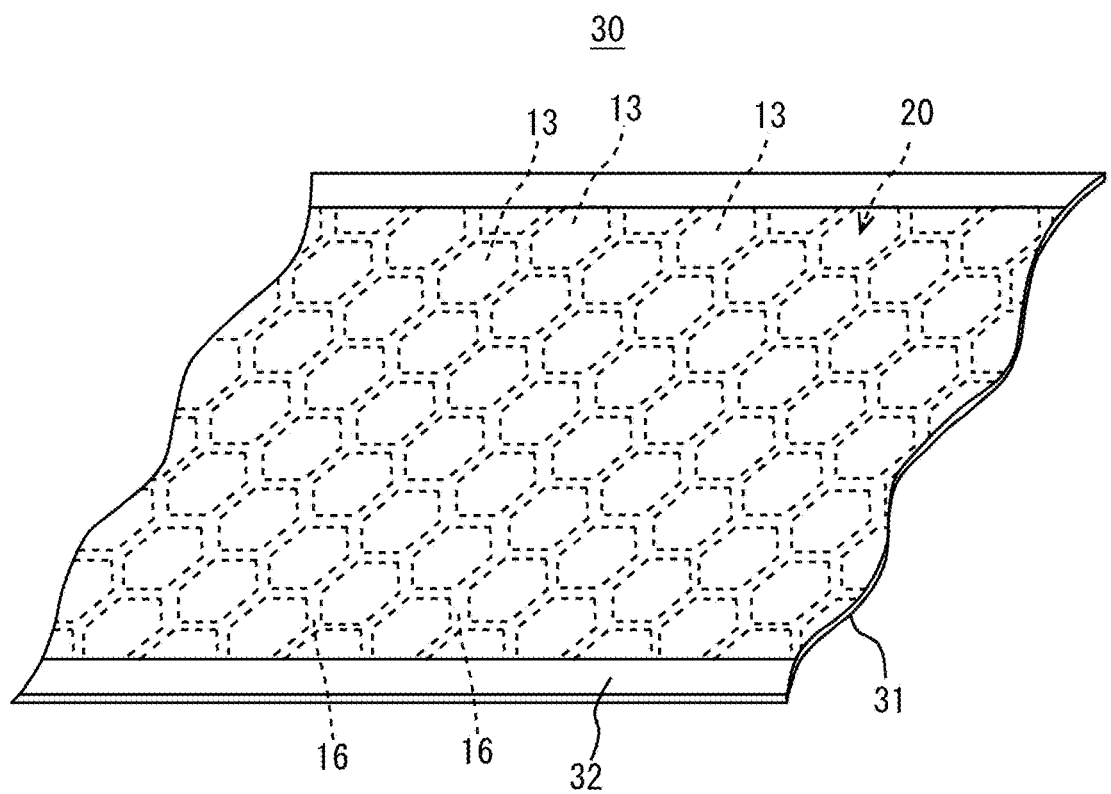
FIG. 1 shows a perspective view of a composite according to an embodiment.
Figure 2:
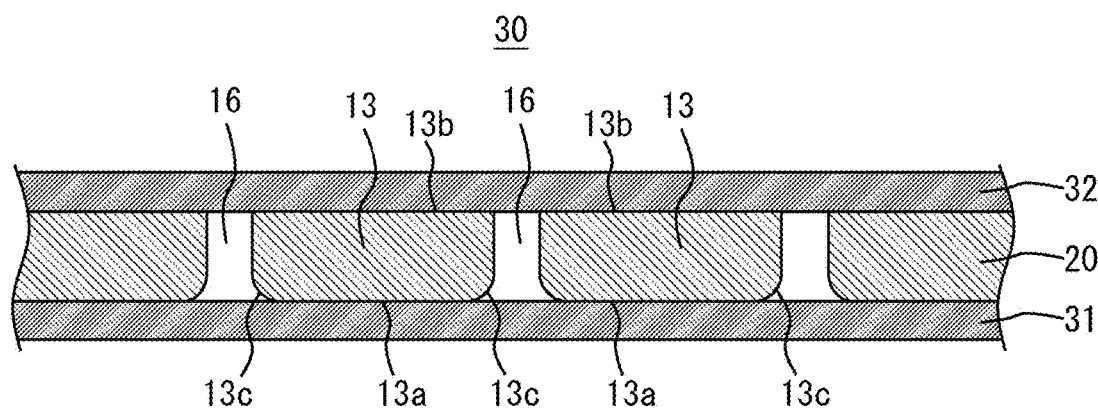
FIG. 2 shows a cross-sectional view of the composite according to the embodiment.

A composite (laminate) 30 according to the present embodiment will be described. The composite 30 is a sandwich-structured panel, as shown in FIGS. 1 and 2. The composite 30 comprises a core material layer (also called the "interlayer") 20, a first skin material 31 laminated on the core material layer 20, and a second skin material 32 which is laminated on the opposite side of the core material layer 20 to the first skin material 31 and interposes, together with the first skin material 31, the core material layer 20. The composite 30 can be used, for example, for panel materials where light weight and rigidity are regarded as more important than strength. Specifically, the composite 30 can be used as a structural material for mobile vehicles such as aircraft, automobiles or bicycles (e.g., sports bicycles), electrical equipment, electronic equipment, office equipment, home appliances, medical equipment, or as a panel material for building materials. In the case of mobile vehicles, the composite 30 can be used as an aerodynamic component that constitutes the exterior.

Each skin material 31, 32 is, for example, a skin material or a panel material, respectively made of a material different from that of the core material layer 20. Any of metallic, plastic or inorganic material may be used as the material of each skin material 31, 32. In this embodiment, fiber-reinforced plastic is used as the material for each skin material 31, 32. As the fiber-reinforced plastic, a fiber-reinforced plastic reinforced by carbon fibers can be used. As this fiber-reinforced plastic, a prepreg (e.g., "PYROFIL prepreg (registered trademark)" manufactured by Mitsubishi Chemical Corporation) in which carbon fibers are impregnated with resin (a matrix) can be used. Thermosetting epoxy resin can be used as the matrix of this prepreg.

Any of the inorganic, organic, or metallic fibers can be used as the fiber of the fiber-reinforced plastic. For example, glass fiber, carbon fiber, aramid fiber, polyethylene fiber, polyester fiber, tungsten fiber, steel fiber, boron fiber, etc. can be used. Additionally, either of thermosetting resin and thermoplastic resin can be used for the matrix of the fiber-reinforced plastic. For example, polyester resin, epoxy resin, phenol resin, vinylester resin, polyimide resin, polypropylene resin, nylon resin, polyetheretherketone resin, polybutylene terephthalate resin, bismaleimide resin or the like can be used.

The core material layer 20 is laminated on each of the skin materials 31, 32. In the core material layer 20, a plurality of plate-shaped flakes 13 identical to each other in thickness is arranged in a two-dimensional plane as a core material. The plurality of plate-shaped flakes 13 is aligned along the surface of each of the skin materials 31, 32. Each plate-shaped flake 13 is a small flake of a thin flat plate. Each plate-shaped flake 13 is made of an identical material, and is identical in shape and size. In the present description, "a plurality of" in "a plurality of plate-shaped flakes" means 10 or more. The number of plate-shaped flakes 13 in the laminate 30 is at least 10 or more. This number may be 50 or more.

A plate-shaped flake 13 is made, for example, of a sheet material, a film material or a resin foam. A material smaller in density than the skin materials 31, 32 can be used for the plate-shaped flake 13. For the plate-shaped flake 13, a material whose density is, for example, in the range of 30-2,000 kg/m3 can be used. The density of the plate-shaped flake 13 can be appropriately designed in accordance with the physical properties or use purpose of a composite 30, and can be set to a value outside the above-mentioned range.

As a material of the plate-shaped flake 13, a resin (such as a resin foam), a wood material (such as balsa, veneer, or other plywood) or a metallic foam (such as an aluminum alloy) can be used. In this embodiment, the plate-shaped flake 13 is made of rigid resin foam. The plate-shaped flake 13 is made, for example, of a polymethacrylimide (PMI) closed cell foam (e.g., "ROHACELL (registered trademark)" (EVONIK Industries AG)). The density of the plate-shaped flake 13 is set to a value (e.g., 110 kg/m3) in a range between 30 kg/m3 and 500 kg/m3 from the viewpoint of weight reduction of the composite 30.

As the rigid resin foams used for the material of the plate-shaped flake 13, polystyrene foam, polyvinyl chloride foam, cellulose acetate foam, polyurethane foam, phenol foam, epoxy foam, acrylic foam, polymethacrylimide foam, polypropylene foam, and polyethylene terephthalate foam, polycarbonate foam, polyamide-imide foam, or polyphenylene sulfide foam can be used.

Figure 3:
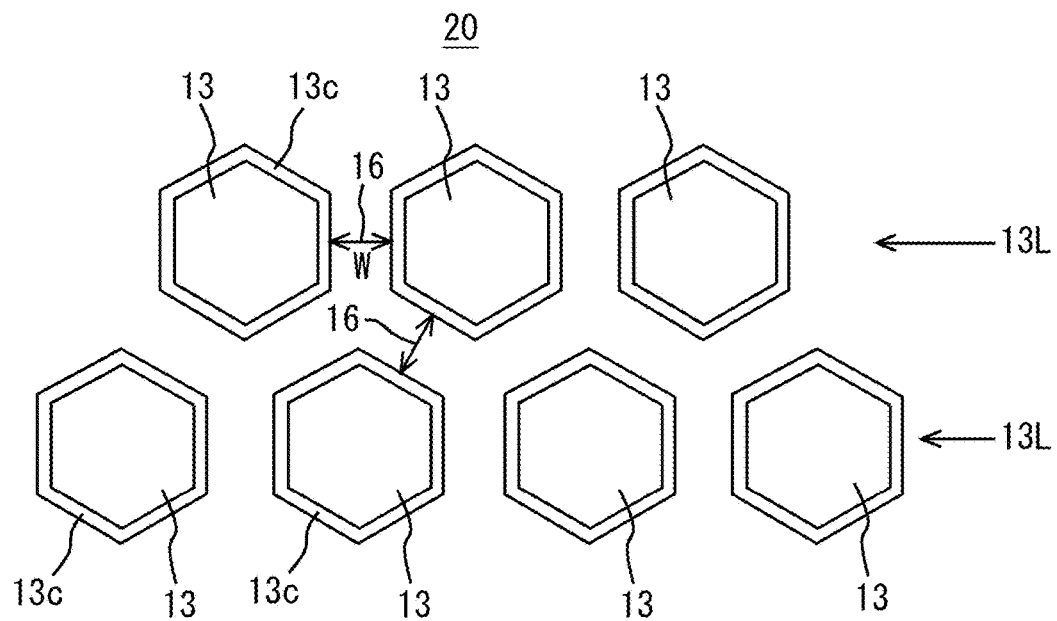
FIG. 3 shows a plan view of a core material layer of the composite according to the embodiment on the side wherein a chamfered portion is formed.

In the core material layer 20, a planar shape (periphery shape) of the plate-shaped flake 13 is a regular polygon (a regular hexagon in this embodiment), as shown in FIG. 3. As the planar shape of the plate-shaped flake 13, a triangular, rectangular, hexagonal, or equilateral pentagonal shape can be selected in the case where the plurality of plate-shaped flakes 13 is uniformly laid out. Additionally, the planar shape of the plate-shaped flake 13 can be other than these shapes, and other polygons, circles, or ovals can also be selected. The planar shape of the plate-shaped flake 13 can be chamfered or rounded at each corner in a plan view in the case where a polygon is regarded as the basic shape.

The thickness of a plate-shaped flake 13 can be, for example, in the range of 0.05 mm to 10 mm (e.g., 0.05 mm to 2 mm). Additionally, for the planar dimension of the plate-shaped flake 13, the average value (the average value thereof with respect to 360 degrees. In the case of a circular shape, the average value is a radius) of the distance from the center of gravity to the periphery can be set to a value (e.g., 5 mm) between 3 mm and 50 mm, and in the case of a regular hexagonal shape, the length of one side can be set to a value (e.g., 5 mm) between 3 mm and 10 mm. However, the dimension of the plate-shaped flake 13 can be set to a value outside the range described in this paragraph.

In the core material layer 20, all of the plate-shaped flakes 13 are separated from each other to form a discrete entity. The entire perimeter of each plate-shaped flake 13 is separated from all adjacent plate-shaped flakes 13 by a gap 16. Each plate-shaped flake 13 is independent of each other to be an island-like structure. The adjacent plate-shaped flakes 13 are not connected to each other by the connection portions of the material identical to that of the plate-like pieces 13, unlike the reinforcing structure of Patent Document 2 above. The composite 30 is a multi-web panel in which each skin material 31, 32 functions as a flange in an I-beam structure and wherein each plate-shaped flake 13 functions as a web, and is a sandwich-structured panel in which each plate-shaped flake 13 functions as a core material.

The adjacent plate-like pieces 13 face each other with a gap 16 between one side and the other. The width W of the gap 16 varies in accordance with the size of the gap between adjacent blades 24 in an upper die 23 described below, or the like. The width W of the gap 16 is constant along the sides facing each other. In each plate-shaped flake 13, the width W of the gaps 16 which all the sides face is identical to each other. The dimension of the width W of the gap 16 is appropriately designed in accordance with the size of the composite 30, and can be set to be in the range of 0 mm or more and 10 mm or less, for example.

In the core material layer 20, the ratio R1 of total area of the plate-shaped flakes 13 to the whole area of the laminate 30 in a plan view can be adjusted by the dimension of the gap 16 between adjacent plate-shaped flakes 13. The ratio R1(%) can be expressed by Formula 1.

$$R1=(S2/S1)\times 100 \qquad \text{Formula 1:}$$

Here, S1 represents the total area of the core material layers 20 (the total area of the plate-shaped flakes 13 and the gap 16) and S2 represents the total area of all the plate-shaped flakes 13 (the area in the case where they are viewed in the thickness direction). In a state where the gap 16 is not filled with anything, the value obtained by subtracting R1 from 100(%) is approximately equal to the porosity R2(%) of the core material layer 20. The percentage R1 is less than 100% and can be 50% or more (in some cases, 70% or more). In the case where the planar shape of each plate-shaped flake 13 is a triangular, rectangular, hexagonal or equilaterally pentagonal, a space in the core material layer 20 can be filled efficiently. In the case where regular hexagonal plate-shaped flakes 13 whose side is 5 mm long are uniformly laid out with the gap of 1 mm, the ratio R1 is 80%. In the case where regular hexagonal plate-shaped flakes 13 whose side is 5 mm long are uniformly laid out with the gap of 3 mm, the ratio R1 is 55%.

In a core material layer 20, the plurality of plate-shaped flakes 13 is arranged in a regular manner. The plurality of plate-shaped flakes 13 is uniformly laid out. In this embodiment, a staggered arrangement is adopted as the arrangement of plate-shaped flakes 13, in which the positions of the plate-shaped flakes 13 are shifted by half a pitch between adjacent plate-shaped flake rows 13L. In this embodiment the planar shape of each plate-shaped flake 13 is a regular hexagon, and the arrangement of the plate-shaped flakes 13 can also be called a honeycomb arrangement in which the gap is formed between the adjacent plate-shaped flakes 13.

A chamfered portion 13c is formed around the outer periphery of one main surface (one of the two surfaces parallel to an arrangement plane of each plate-shaped flake 13, the bottom surface in FIG. 2) 13a of each plate-shaped flake 13 all the way around. The chamfered portion 13c is a trace (cutting mark) indicating that the plate-shaped flake 13 was formed by a punching process, and is an arc-shaped curved surface (for example, an R surface of about 0.05 mm) or a curved surface that bulges outward like an arc. The shape of the chamfered portion 13c depends on the tip shape of a blade 24 used in the punching process. In each plate-shaped flake 13, the dimensions of the chamfered portion 13c are substantially uniform over the entire circumference. In this description, the "main surface" of the plate-shaped flake 13 is the front or back surface.

Additionally, among the plurality of plate-shaped flakes 13 (e.g., all plate-shaped flakes 13 of the core material layer 20), cutting directions along a thickness direction, which is determined from cutting marks formed on the outer periphery as a trace of being manufactured by using a transfer sheet 10 described below, are identical to each other. Specifically, the plurality of plate-shaped flakes 13 has chamfered portions 13c formed on the outer periphery of the main surface 13a on the same side in the thickness direction. Additionally, as an another trace of using the transfer sheet 10, in the skin material 32 laminated on the main surface 13b, out of the main surfaces 13a, 13b of the plate-shaped flake 13, which is located on a progressive side of cutting as the cutting directions along the thickness direction, a cutting scratch 43 that would be formed if the plurality 32 of plate-shaped flakes 13 was formed on the skin material 32 by a process of the cutting is not present on an inner surface (a surface toward the core material layer 20). Specifically, in the second skin material 32 laminated on the main surface 13b, out of the main surfaces 13a and 13b of the plate-shaped flakes 13, which lies on the side opposite to the side where the chamfered portion 13c is formed on the outer periphery, the cutting scratch 43 is not present on the inner surface. The cutting scratch 43 will be a V-shaped depression in the case of being cut by the blade 24 of the upper die 23 described later. The absence of this cutting scratch 43 also holds for the variation in which burrs 13d are formed on the outer surface of the plate-shaped flake 13 (see FIG. 25(b)).

[Configuration of Transfer Sheet]

Next, the transfer sheet 10 used for manufacturing the composite 30 will be explained. The transfer sheet 10 is a sheet capable of transferring a plurality of plate-shaped flakes 13 from a base sheet 11 to another structural material (a structure with pressure-sensitive adhesive or adhesive on its surface).

Figure 4:
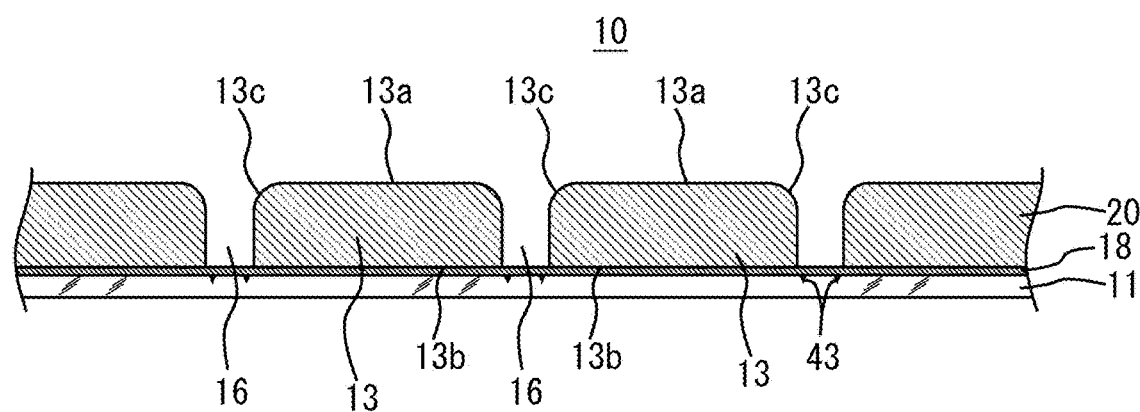
FIG. 4 shows a cross-sectional view of a transfer sheet according to the embodiment.

The transfer sheet 10 has a core material layer 20 and the base sheet 11 laminated on the core material layer 20, as shown in FIG. 4. On the surface of the base sheet 11 toward the core material layer 20, cutting scratches (dents) 43, formed when the plurality of plate-shaped flakes 13 was cut, are left. In the core material layer 20, adjacent plate-shaped flakes 13 are separated by the gap 16. Additionally, the plurality of plate-shaped flakes 13 has the chamfered portions 13c formed on the outer periphery of the main surface 13a on the same side in each plate-shaped flake 13 in the thickness direction. The transfer sheet 10 corresponds to the "laminate" and the base sheet 11 corresponds to the "skin material."

For example, a sheet or film made of resin (such as a thermoplastic resin sheet) is used for the base sheet 11. A variety of resins such as polyethylene, polypropylene, urethane, polyester, polyethylene terephthalate (PET), or polycarbonate can be used as a resin to be used for the base sheet 11. In this embodiment, polyethylene terephthalate (e.g., the "PET75 series of slightly-pressure-sensitive adhesive sheets for processing" manufactured by Nichiei Kako Co., Ltd.) is used as the material of the base sheet 11. The thickness of the base sheet 11 can be set to a value in the range of 0.01 mm to 0.5 mm (e.g., 0.075 mm). In addition to resin, rubber or paper sheets (or films) can also be used as the base sheet 11.

On one side of the base sheet 11 (the upper side in FIG. 4), a pressure-sensitive adhesive layer 18 is formed by applying a pressure-sensitive adhesive (an adhesive with pressure-sensitive property; one that is not cured at room temperature). Various types of pressure-sensitive adhesives can be used, such as acrylic, urethane, or silicone ones. In the case of the base sheet 11 of the PET75 series of slightly-pressure-sensitive adhesive sheets for processing described above, the pressure-sensitive adhesive layer 18 is formed in advance on one side by applying an acrylic adhesive. However, in the case of using a substrate sheet 11 that does not have a pressure-sensitive adhesive layer 18 formed in advance, the pressure-sensitive adhesive layer 18 is formed of a pressure-sensitive adhesive such as spray glue. In this case, spray glues such as acrylic adhesives (e.g., "Spray Glue Series" manufactured by 3M Japan Corporation) can be used. As for the base sheet 11, one that is made by laminating a double-sided adhesive film to a resin film may be used.

The plurality of plate-shaped flakes 13 is peelably attached to the surface of the base sheet 11. Each plate-shaped flake 13 is held to the base sheet 11 with a certain adhesiveness by the pressure-sensitive adhesive layer 18. Each plate-shaped flake 13 is attached to the base sheet 11 on the side opposite to the side where the chamfered portion 13c is formed on the outer periphery. If the surface of the base sheet 11 has adherence property, the pressure-sensitive adhesive layer 18 may be dispensed with.

The arrangement of plate-shaped flakes 13 on the base sheet 11 is the origin of the arrangement of the plate-shaped flakes 13 in the core material layer 20 of the composite 30. The plan view of the core material layer 20 of the transfer sheet 10 will be the same as in FIG. 3.

Specifically, in the core material layer 20, the planar shape (peripheral shape) of the plate-shaped flake 13 is regular polygons (regular hexagons in this embodiment), as shown in FIG. 3. In the core material layer 20, all the plate-shaped flakes 13 are separated from each other to form a discrete entity. Each plate-shaped flake 13 has an island-like structure independent of each other.

The adjacent plate-shaped flakes 13 face each other with a gap 16 between one side and the other. The width W of the gap 16 is constant along the sides facing each other. In each plate-shaped flake 13, the width W of the gaps 16 which all the sides face are equal to each other. Additionally, in the core material layer 20, the ratio R1 of total area of the plate-shaped flakes 13 to the whole area of the laminate 30 in a plan view is less than 100% but 50% or more (in some cases, 70% or more). The width W of the gap 16 need not be constant along the sides facing each other, and in each plate-shaped flake 13, the width W of the gaps 16 which all sides face need not be equal to each other.

A chamfered portion 13c is formed around the outer periphery of one main surface 13a (the upper surface in FIG. 4) of each plate-shaped flake 13, all the way around. In each plate-shaped flake 13, the dimensions of the chamfered portion 13c are substantially uniform over the entire circumference.

[Method of Manufacturing Composite]

In the method for manufacturing the composite 30, a first manufacturing process for manufacturing the transfer sheet 10, and a second manufacturing process for manufacturing the composite 30 using the transfer sheet 10 obtained in the first manufacturing process, are carried out in this order. The transfer sheet 10 corresponds to an intermediate sheet.

In the first manufacturing process, an attaching step of attaching a material sheet 14 to a base sheet 11, and a cutting step of dividing the material sheet 14 into a plurality of plate-shaped flakes 13 by performing a punching process (press cutting) on the material sheet 14 in the state of being attached to the base sheet 11 are performed in this order. The material sheet 14 is a sheet that is used as a material of the plate-shaped flake 13, and, for example, a sheet of a polymethacrylimide (PMI) closed cell foam obtained by carrying out slicing process at a predetermined thickness of 0.05 mm or more but 10 mm or less can be used.

Figure 5:
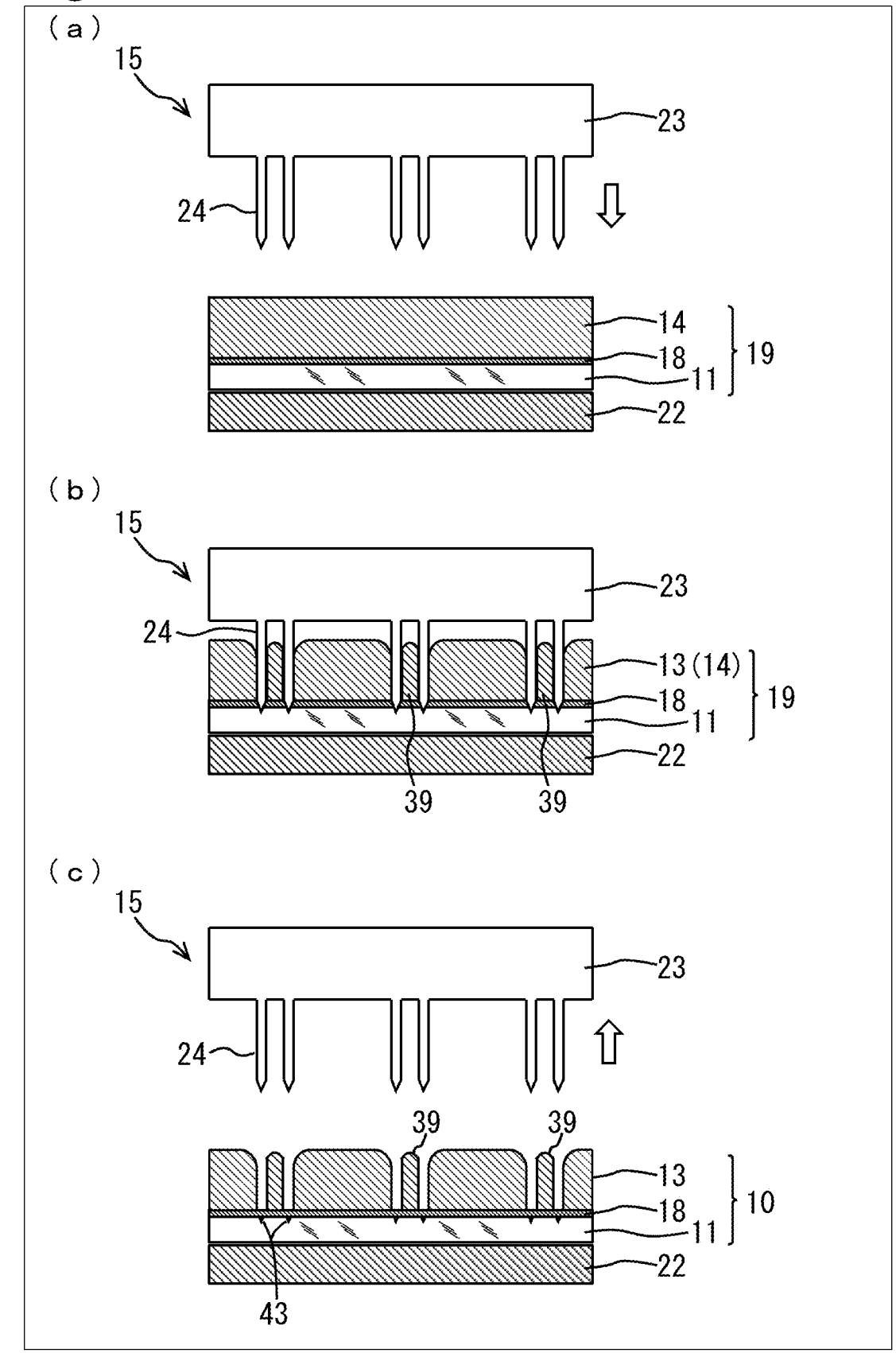
FIG. 5 shows a cross-sectional view to explain a first manufacturing process (method of manufacturing the transfer sheet) according to the embodiment.
Figure 6:
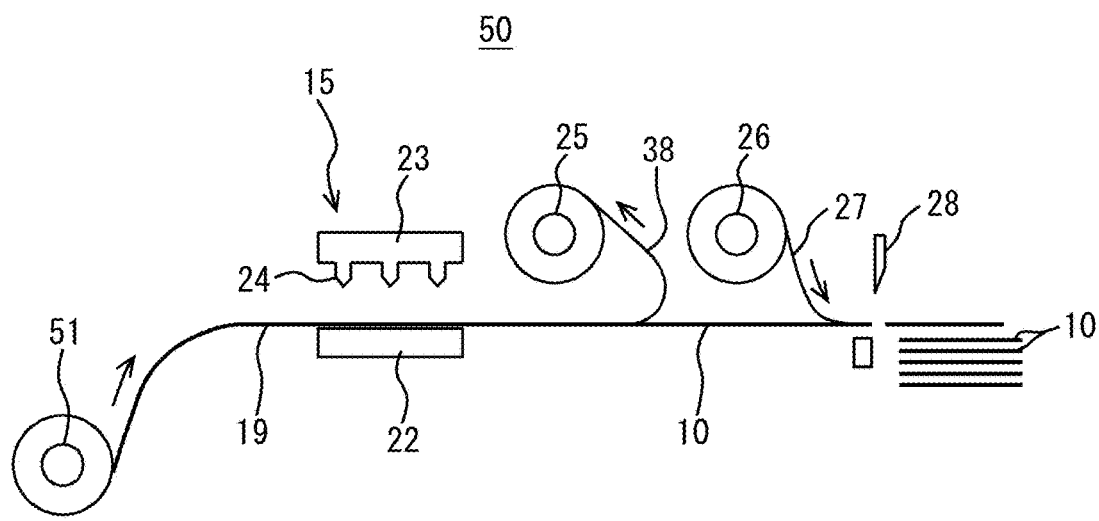
FIG. 6 shows a schematic diagram of a manufacturing line used in the first manufacturing process according to the embodiment.

In the attaching step, a laminated sheet 19 (see FIG. 5(a)) wherein a long material sheet 14 is attached to a long base sheet 11 by a pressure-sensitive adhesive layer 18 is made. The laminated sheet 19 is wound into a roll and installed on a reel 51 (see FIG. 6) of a manufacturing line 50. The laminated sheet 19 is then unwound in the longitudinal direction and passed through a pressing device 15. The base sheet 11 and material sheet 14 may be attached by a press capable of pressurizing or heating and pressurizing, roller, or ultrasonic horn.

In the cutting step, the laminated sheet 19 on the lower die 22 of the pressing device 15 is cut vertically by the blade 24 of an upper die 23, thereby the material sheet 14 is press-cut. On that occasion, as shown in FIG. 5(b), the base sheet 11 is subjected to so-called half-cutting (that is, is cut to the extent that it is not cut through) without being severed. In this embodiment, the plurality of plate-shaped flakes 13 is formed on the base sheet 11, and the transfer sheet 10 (see FIG. 5(c)) is manufactured. As for the planar shape of the blade 24, one that corresponds to the peripheral shape of a plate-shaped flake 13 is used. For example, in the case of forming a regular hexagonal plate-shaped flake 13, a blade 24 that is regular hexagonal in a plan view is used. In the upper die 23, a plurality of blades 24 are separated from each other by gaps and arranged on a two-dimensional plane.

Figure 7:
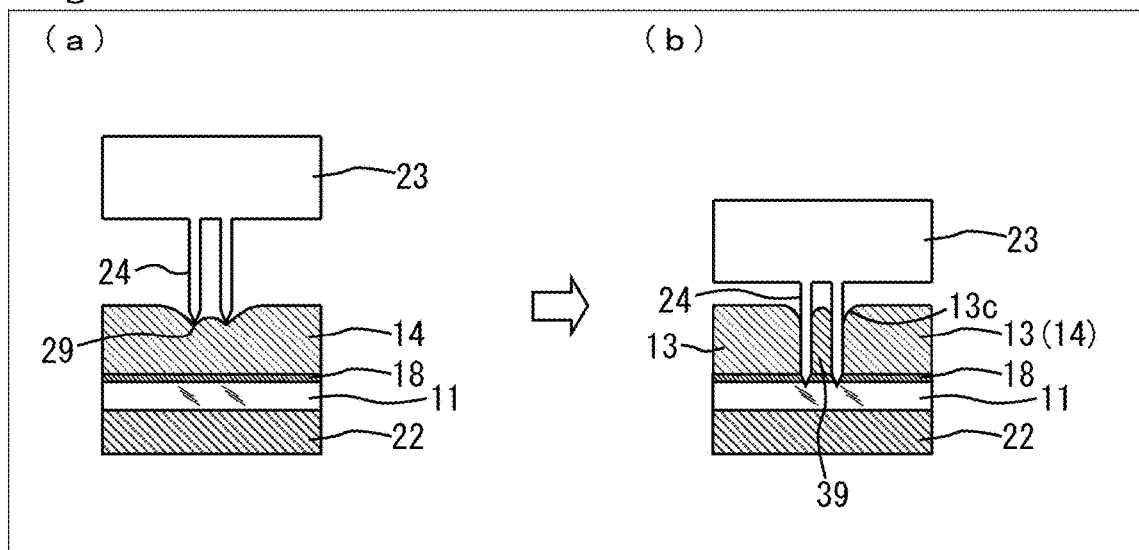
FIG. 7 shows a cross-sectional view of how a chamfered portion is formed on a plate-shaped flake during press cutting in the first manufacturing process according to the embodiment.

Here, in the punching process, as shown in FIG. 7(a), a part 29, which the tip of the blade 24 comes into first contact with, of the surface of the material sheet 14 is pressed in. Then, the area around the part 29 is plastically deformed. Therefore, after the material sheet 14 is cut by the blade 24, the chamfered portion 13c is formed around the outer periphery of the plate-shaped flake 13 as shown in FIG. 7(b) as a trace of plastic deformation. The chamfered portion 13c is an arc-shaped curved surface or a curved surface that bulges outward like an arc, as described above. In addition, cutting dust 39 is formed between the blades 24. In the punching process, depending on cutting conditions, burrs 13d (see FIG. 25(b)) instead of chamfered portions 13c are formed on the outer periphery of the main surface 13a of each plate-shaped flake 13, in some cases. However, no matter what is formed, cutting marks that allow the cutting direction of the thickness direction to be identified remain on the outer periphery of the main surface 13a of the plate-shaped flake 13.

In this embodiment, the upper die 23 moves up and down with respect to the lower die 22 during press-cutting, but press-cutting may be performed by pressurization of wheel rolling by a wheel rolling die (die-cut roll).

Cutting dusts 39 of the material sheet 14 cut by the press device 15 form a reticulated sheet 38 wherein they are connected to each other. The reticulated sheet 38 formed of the cutting dusts 39 is wound up by a take-up reel 25 to be removed (see FIG. 6). Additionally, since a protective film 27 unwound from a roll provided on another reel 26 is laminated on the plate-shaped flakes 13 side of the transfer sheet 10, the plurality of plate-shaped flakes 13 is covered by the protective film 27. Further, in this embodiment, the long transfer sheet 10 is cut by a cutter 28 at a predetermined length and divided into a plurality of transfer sheets 10. Winding by the take-up reel 25, coating with the protective film 27, and cutting by the cutter 28 may be dispensed with.

In the second manufacturing process, a transfer step of transferring the plurality of plate-shaped flakes 13 present on the transfer sheets 10 to a first skin material sheet 31A, and a lamination step of laminating a second skin material sheet 32A on the plurality of plate-shaped flakes 13 are performed in this order. Each of the skin material sheets 31A and 32A is the material for the skin materials 31 and 32 (see FIG. 2) described above, and for example, a prepreg (prepreg sheet) in a semi-cured state can be used.

Figure 8:
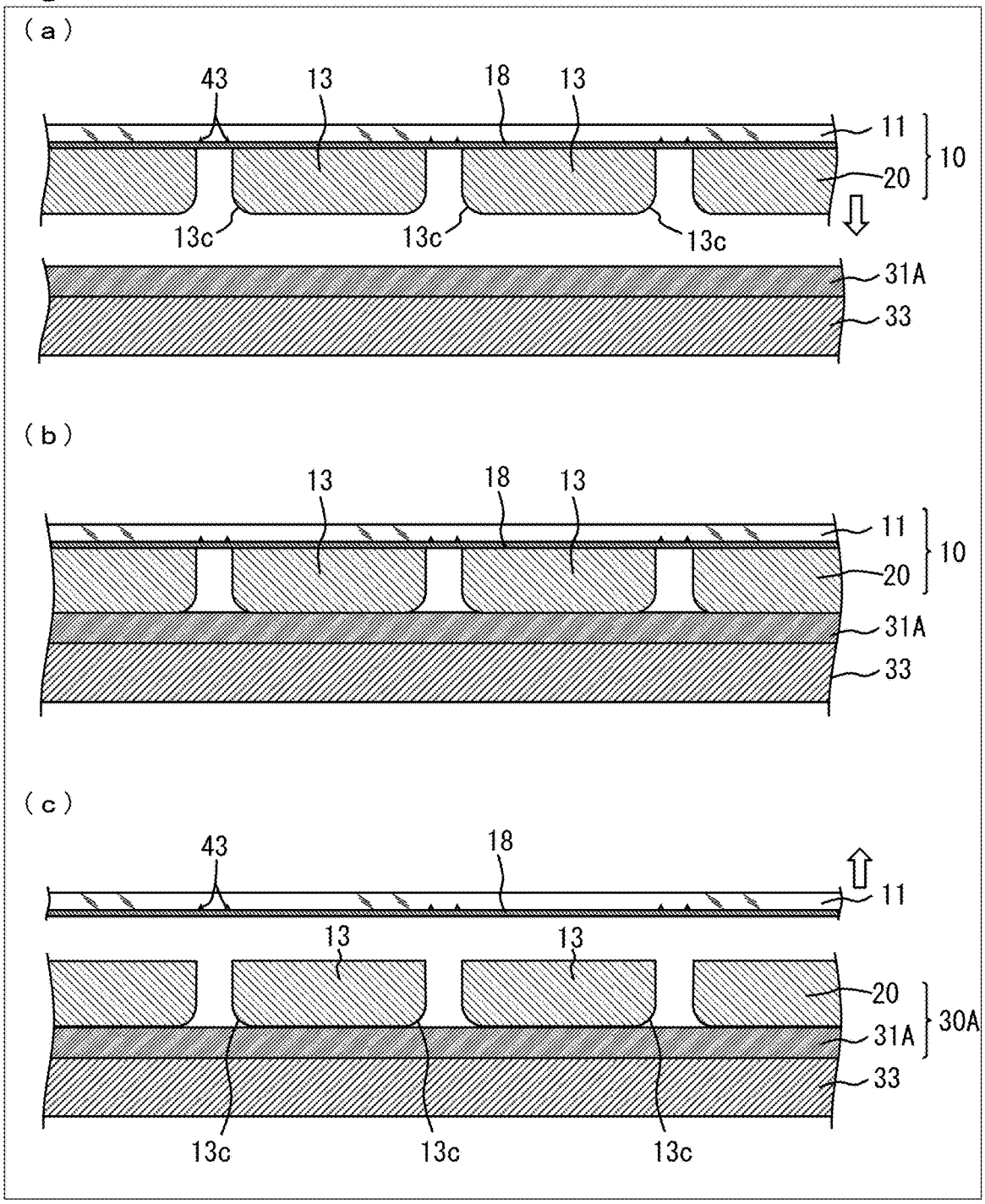
FIG. 8 shows a cross-sectional view to explain a transfer step of a second manufacturing process according to the embodiment.

In the transfer step, first, a first skin material sheet 31A is placed on a molding die 33 (e.g., a metal mold). Next, as shown in FIG. 8(a), the transfer sheet 10 obtained in the first manufacturing process is placed while directing the plate-shaped flakes 13 side toward the first skin material sheet 31A on the molding die 33. Next, as shown in FIG. 8(b), the plurality of plate-shaped flakes 13 of the transfer sheet 10 is pressed against the first skin material sheet 31A. The surface of the first skin material sheet 31A has adhesive properties. Therefore, the plurality of plate-shaped flakes 13 is attached to the first skin material sheet 31A. Then, as shown in FIG. 8(*c*), the base sheet 11 is peeled off from the plurality of plate-shaped flakes 13. Consequently, since the adhesive force of the first skin material sheet 31A to the plurality of plate-shaped flakes 13 is greater than the adhesive force of the pressure-sensitive adhesive layer 18 to the plurality of plate-shaped flakes 13, the plurality of plate-shaped flakes 13 are transferred from the base sheet 11 to the first skin material sheet 31A.

A pressure-sensitive adhesive with temperature susceptibility may be used as a pressure-sensitive adhesive for the pressure-sensitive adhesive layer 18. In the case of using, for example, a warm-off type pressure-sensitive adhesive whose adhesive force is lowered above a given switching temperature (e.g., "Thermosensitive Adhesive Sheet Intelimer Tape Warm-off Type" manufactured by Nitta Corporation, e.g., whose switching temperature is 50° C.) for the pressure-sensitive adhesive layer 18, the base sheet 11 is heated from the back surface (upper side in FIG. 8) in the state shown in FIG. 8(*b*), and when the pressure-sensitive adhesive layer 18 is above the switching temperature, the base sheet 11 is peeled off. On the other hand, in the case of using a cool-off type pressure-sensitive adhesive whose adhesive force is lowered below a given switching temperature (e.g., "Thermosensitive Adhesive Sheet Intelimer Tape Cool-off Type" manufactured by Nitta Corporation, e.g., whose switching temperature is 25° C.) for the pressure-sensitive adhesive layer 18, the base sheet 11 is cooled from the back surface in the state shown in FIG. 8(*b*), and when the pressure-sensitive adhesive layer 18 is below the switching temperature, the base sheet 11 is peeled off. In the case of using the pressure-sensitive adhesive with temperature susceptibility, the base sheet 11 can be easily peeled off from a plate-shaped flake 13. Also, on the occasion of peeling off the base sheet 11, the effect on the adhesiveness state between each plate-shaped flake 13 and the first skin material sheet 31A is insignificant.

Figure 9:
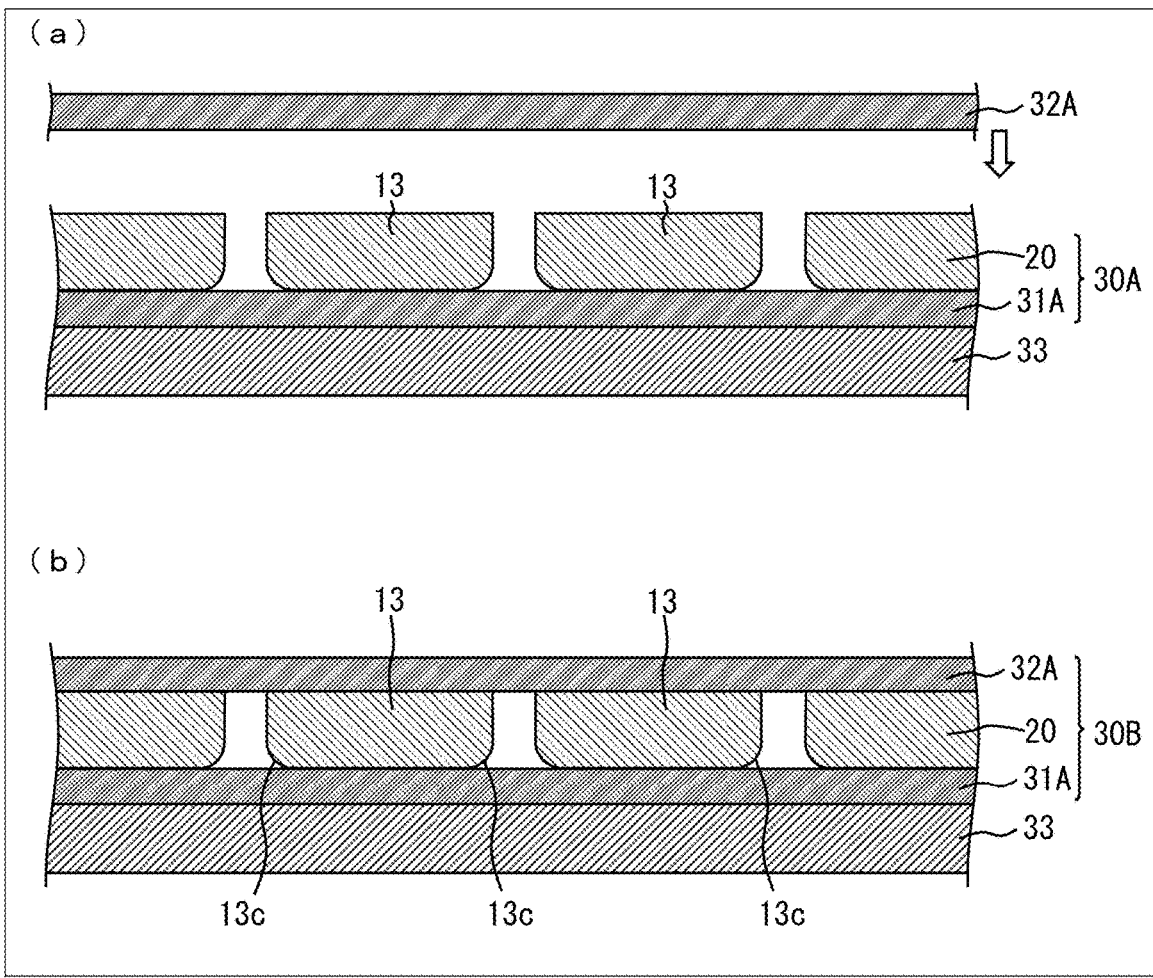
FIG. 9 shows a cross-sectional view to explain a stacking step of the second manufacturing process according to the embodiment.

Next, in the lamination step, as shown in FIG. 9(*a*), the second skin material sheet 32A is placed so as to face the plate-shaped flake 13 side of a laminate 30A obtained in the transfer step, while being apart from it. Then, as shown in FIG. 9(*b*), the second skin material sheet 32A is laminated on the plate-shaped flake 13 side of the laminate 30A. The surface of the second skin material sheet 32A has adhesive properties. Therefore, the plurality of plate-shaped flakes 13 is attached to the second skin material sheet 32A. As a result, a laminate 30B having the plurality of plate-shaped flakes 13 interposed by a pair of skin material sheets 31A, 32A is obtained.

Further, in the case where the matrix of a prepreg used for each skin material sheet 31A, 32A is a thermosetting resin (e.g., epoxy resin), a molding step is performed. In the molding step, the laminate 30B obtained in the lamination step is sealed by using a bagging film. The laminate 30B sealed with the bagging film is then heated in an autoclave at a predetermined temperature and pressure (e.g., 0.2 MPa, 130° C.) for a predetermined period of time (e.g., 2 hours). In the process of this heating, the skin material sheets 31A and 32A with semi-cured state become fully-cured skin materials 31 and 32. As a result, a composite 30 which is formed and cured in a predetermined shape (in the case of FIG. 9(*b*), a flat plate shape) is completed.

In the case where the matrix of the prepreg used for each surface material sheet 31A, 32A is a thermoplastic resin (e.g., polyamide resin, polypropylene resin, polyetheretherketone resin), the curing step is performed by cooling the laminate 30B in an atmosphere of a temperature lower than the curing temperature of the matrix (e.g., room temperature) after a molding step such as pressurized heat press molding to complete the composite 30.

Effects and the Like of Embodiment

Among the transfer sheet 10 of this embodiment, cutting directions along a thickness direction, which is determined from the cutting marks formed on the outer periphery of the plurality of plate-shaped flakes 13 as a trace of forming the plurality of plate-shaped flakes 13 by performing a punching process on the base sheet 11, are identical with each other. Specifically, the plurality of plate-shaped flakes 13 has a chamfered portion 13*c* (or burr 13*d*) formed on the same side in the thickness direction. On the base sheet 11 of the transfer sheet 10, the plurality of plate-shaped flakes 13 is formed in accordance with a plan-view cutting shape (punching shape) in the punching process.

In the composite 30 of this embodiment, chamfered portions 13*c* are formed on the same side in the thickness direction in the plurality of plate-shaped flakes 13 as a trace of being manufactured using the transfer sheet 10. On the first skin material 31 of the composite 30, the plurality of plate-shaped flakes 13 is arranged in accordance with the arrangement of the plate-shaped flakes 13 in the transfer sheet 10. Therefore, since it is not necessary to arrange the plurality of plate-shaped flakes 13 individually on the skin material sheet 31A, the core material layer 20 in which the plurality of plate-shaped flakes 13 is arranged can be easily formed. In addition, in the case of FIG. 9 of Patent Document 1, it is difficult to precisely arrange the disk-shaped plates, but this embodiment makes it easy also to precisely arrange the plurality of plate-shaped flakes 13 on the skin material sheet 31A.

Additionally, in the composite 30 of this embodiment, adjacent plate-shaped flakes 13 are separated by the gap 16 to form a discrete entity. Here, in the case of using a rigid foam for the plate-shaped flakes 13, conventional sandwich-structured composites realize light weight and high rigidity by having a foam, a honeycomb structure, or a core material layer consisting of many material islands connected to each other. However, since the conventional composite is formed in a continuous structure in its core material layer, it is easily damaged when its rigid foam, which lacks toughness, is bent, and therefore, it is difficult to form it in a complicated three-dimensional shape. In the case where the composite is made to be in a curved shape, the range of bending is restricted.

Figure 10:
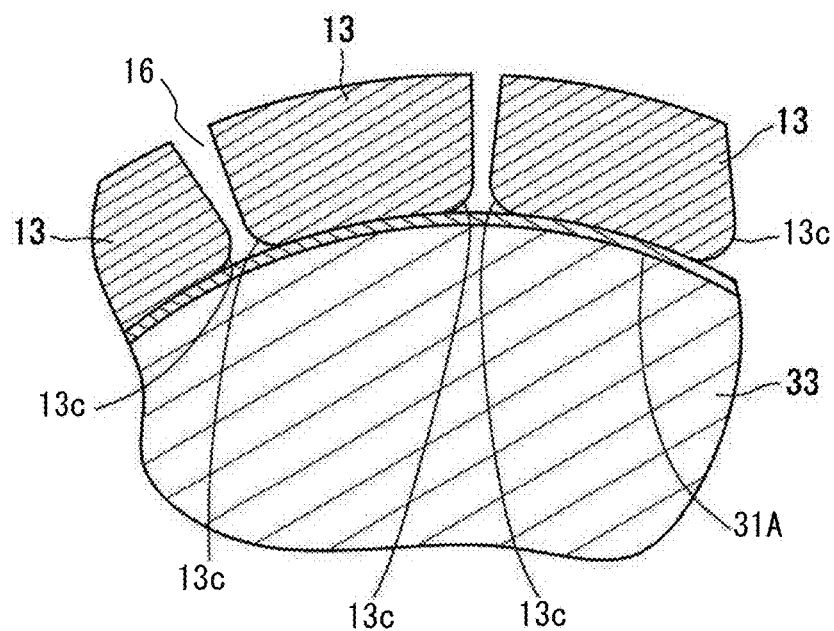
FIG. 10 shows a cross-sectional view when using a molding die whose cavity surface is curved in the second manufacturing process according to the embodiment.

In contrast, in this embodiment, even in the case of using, as shown in FIG. 10, the molding die 33 whose cavity surface is curved, adjacent plate-shaped flakes 13 are separated by the gap 16, and furthermore, interference between adjacent plate-shaped flakes 13 is suppressed by the gap 16. Therefore, as compared with the conventional composite, damage is less likely to occur even when the core material layer 20 is bent, and there are fewer restrictions on the range of bending on the occasion of forming it in a three-dimensional shape. This embodiment allows a composite 30 excellent in formability into three-dimensional shapes and easy to manufacture, to be provided, and it allows a composite 30 complicated in three-dimensional shape and a composite 30 large in bending, to be realized.

In the case of using the molding die 33 shown in FIG. 10, a composite 30 with a three-dimensional shape that is curved along the cavity surface of the molding die 33 can be obtained. An interference between adjacent plate-shaped flakes 13 is suppressed not only in the case where the cavity surface of the molding die 33 is convex surface as shown in FIG. 10, but also in the case where it is concave one. Besides, in the case of using the molding die 33 whose cavity surface is curved, the followability to the molding die 33 varies in accordance with the width W of the gap 16. Therefore, the width W of the gap 16 can be appropriately designed in accordance with the curvature of the molding die 33.

Additionally, in the composite 30 of this embodiment, prepreg is used as the material for each of skin materials 31, 32. Therefore, when heat treatment is performed, the curable resin (matrix) of the prepreg flows into the gaps 16 between the plate-shaped flakes 13 and fills the gaps 16 of the core material layer 20. The curable resin that flows into the gaps 16 is cured therein. The resin cured in the gaps 16 contains short fibers flowed in together with the resin, from the prepreg. Therefore, the composite 30 can be suppressed from lowering locally in strength. Although the resin from the prepreg fills the gaps 16 of the core material layer 20 in some cases, a fillet is formed at the corner portion between the lateral surface of the plate-shaped flake 13 and the inner surface of the skin materials 31, 32 in one case, and the gaps 16 is filled in the state of containing air bubbles in another case. As a prepreg used as a material for each skin material 31, 32, one which is large in resin amount per unit area can be used in the case where the gaps 16 is large.

Figure 11:
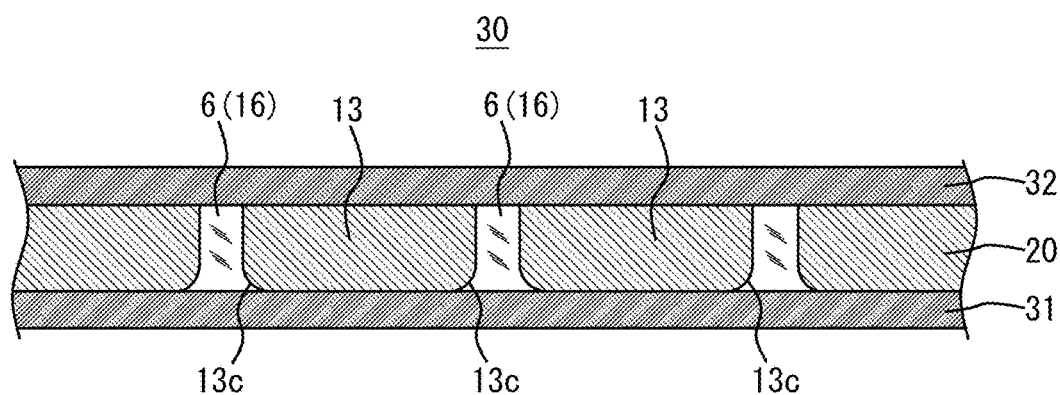
FIG. 11 shows a cross-sectional view when a gap is filled with cured resin in the composite according to the embodiment.

Further, a curable resin (e.g., a thermosetting type, a two-component reaction type, a moisture-reaction type adhesive, etc.) may be injected into the gaps 16 by the plate-shaped flake 13 aside from the matrix of the prepreg, by using a pressure difference. The injected curable resin is cured in the gaps 16. A film-shaped adhesive may also be added between the two skin materials 31, 32. In this case, the film-shaped adhesive is melted when heat treatment is carried out, and the melted adhesive (curable resin) flows into the gaps 16 and is finally cured. In these cases, as shown in FIG. 11, the gaps 16 between adjacent plate-shaped flakes 13 are filled with the cured resin 6, and the composite 30 can be suppressed from deteriorating locally in strength and can be enhanced in rigidity. These processes correspond to a honeycomb formation step of forming a honeycomb structure made of resin in the core material layer 20 by making curable resin flow into the gaps 16 of the core material layer 20, including the plurality of plate-shaped flakes 13, to cure the resin thereafter. In addition, filling with curable resin can be performed even in the case where prepreg is not used as the material for the skin materials 31, 32.

Additionally, since the plate-shaped flake 13 is low in density in this embodiment, the composite 30 light in weight and excellent in specific rigidity can be realized. In this embodiment, the density of the core material layer 20 can be adjusted by adjusting the thickness of plate-shaped flakes 13 and the gap 16 in addition to the density of the plate-shaped flakes 13.

<First Variation>

Figure 12:
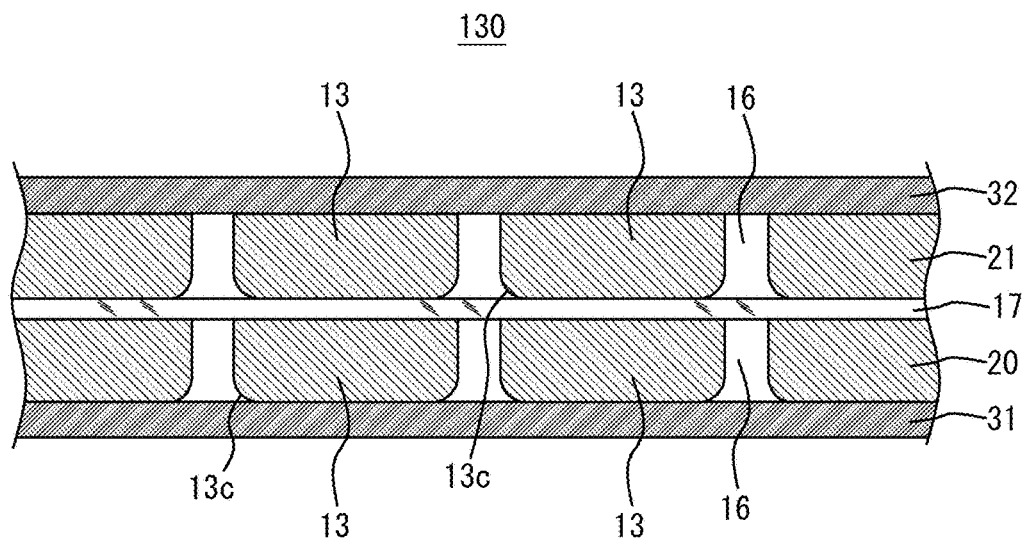
FIG. 12 shows a cross-sectional view of a composite according to a first variation.

In this variation, a composite 130, as shown in FIG. 12, further comprises a second core material layer 21 having a plurality of plate-shaped flakes 13 lined up along the surface of a second skin material 32, and an adhesive interlayer 17 disposed between a first core material layer 20 and the second core material layer 21. The adhesive interlayer 17 is formed of a sheet-shaped adhesive (also referred to as a film-shaped adhesive or adhesive sheet) that is molten by being heated and is thermally cured as it is to adhere the first core material layer 20 and the second core material layer 21. In the composite 130, a first skin material 31, the first core material layer 20, the adhesive interlayer 17, the second core material layer 21, and the second skin material 32 are laminated in this order. Further, the adhesive interlayer 17 may be composed of an adhesive layer in which a sheet-shaped adhesive is melted. Besides, gaps 16 in each core material layer 20, 21 may be filled with cured resin 6.

In this variation, the position of each plate-shaped flake 13 of the first core material layer 20 and the position of each plate-shaped flake 13 of the second core material layer 21 are made to coincide in a plan view, but the position of each plate-shaped flake 13 of the first core material layer 20 and the position of each plate-shaped flake 13 of the second core material layer 21 may be made to deviate from each other.

Further, in this variation, two core material layers 20 and 21 are provided, but three or more core material layers 20 and 21 may be provided. In this case also, the adhesive interlayer 17 may be provided between the core material layers 20 and 21 which are adjacent to each other in the thickness direction.

Besides, a prepreg or a thermosetting resin sheet (such as epoxy resin) may be used for the adhesive interlayer 17, instead of using a sheet-shaped adhesive. In this case, a composite 130 may be manufactured by laminating a plurality of sheets of laminate 10 of a canapé structure which have a base sheet (prepreg) 11 and the plurality of plate-shaped flakes 13 attached to the base sheet 11. In this case, since the resin becomes fluid on the occasion of a heating step to flow into the gaps 16 between plate-shaped flakes 13, the composite 30 can be suppressed from deteriorating locally in strength. Since the surface of the base sheet 11 has adhesive properties, a pressure-sensitive adhesive for holding the plate-shaped flakes 13 can be dispensed with.

In this variation, there are two layers of the plate-shaped flakes 13 in the core material layer 20. Here, in the case of forming a bent composite 30, the greater the thickness of the plate-shaped flakes 13 is, the greater the tensile strain on one side of the plate-shaped flakes 13 is, and depending on the thickness and bending extent of the plate-shaped flakes 13, one side of the plate-shaped flakes 13 may be damaged by the tensile strain. On the other hand, in this variation, each plate-shaped flake 13 will be thinner than that of a composite 30 wherein plate-shaped flakes 13 are in a one-layer structure, in the case of being compared with composites identical in thickness. Therefore, the tensile strain subjected to by one side of each plate-shaped flake 13 will be smaller, which makes damage less likely to occur even in the case of using a low-toughness hard resin foam for the plate-shaped flakes 13. This variation allows a composite 30 more excellent in formability into a three-dimensional shape, to be provided.

<Second Variation>

In this variation, an intermediate sheet manufactured by the above-mentioned first manufacturing process is used as an adhering core material sheet 60, instead of a transfer sheet 10, wherein the base sheet 111 is allowed to be melted in a state of being laminated a skin material sheet 31A in using the base sheet 111 as an adhesive. For the adhesive core material sheet 60, one that is configured to be identical to the above-mentioned transfer sheet 10 can be used. However, in the case of the transfer sheet 10, a pressure-sensitive adhesive that allows each plate-shaped flake 13 to be peeled from the base sheet 11 is used for the pressure-sensitive adhesive layer 18. In the case of the adhesive core material sheet 60, however, it is not necessary to allow each plate-shaped flake 13 to be peeled, and a material sheet 14 can be attached to the base sheet 111 by means of a pressure-sensitive adhesive or an adhesive.

Figure 13:
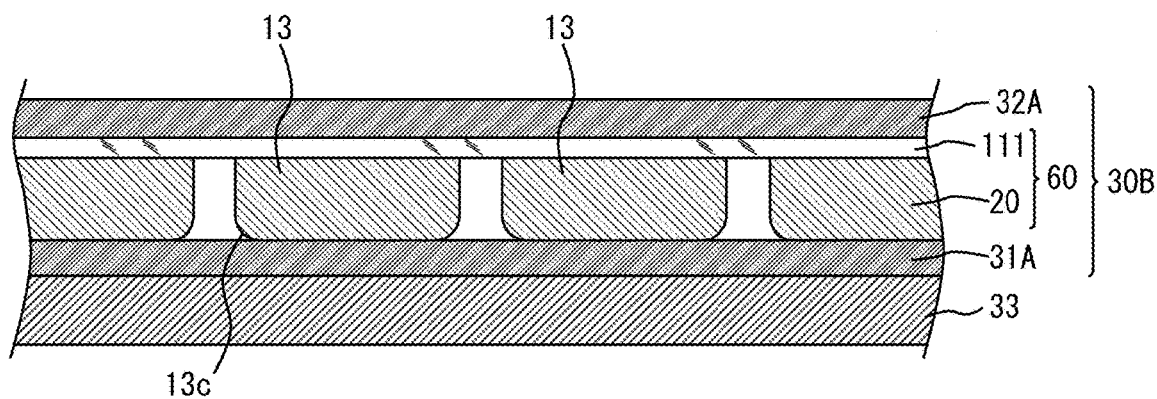
FIG. 13 shows a cross-sectional view of a laminate in the manufacturing process of a composite according to a second variation.

For example, in the case where a plate-shaped flake 13 is in one layer, an adhesive core material sheet 60 and the second skin material sheet 32A are laminated in this order on the first skin material sheet 31A on the molding die 33 in the second manufacturing process for producing a composite 30. Here, as for the lamination of the adhesive core material sheet 60, the plate-shaped flake 13 side thereof may be attached to the first skin material sheet 31A, as shown in FIG. 13. Additionally, the base sheet 111 side thereof may also be attached to the first skin material sheet 31A (not shown). Further, as a result of the lamination of the second skin material sheet 32A, a laminate 30B is obtained. Since the method of manufacturing the composite 30 from the laminate 30B is identical with that of the above-mentioned embodiment, the explanation is dispensed with. In the case where the amount of resin to fill the gap 16 is insufficient, a resin sheet (a sheet identical in properties with the adhesive interlayer 17, for example, a sheet-shaped adhesive, a prepreg, etc.) may be laminated on one or both sides of the core material layer 20.

A plurality of adhesive core material sheets 60 may be used for manufacturing one sheet of a composite 30. In this case, the plurality of adhesive core material sheets 60 may be laminated so that plate-shaped flakes 13 face the same side in the thickness direction. Additionally, as for adhesive core material sheets 60 adjacent to each other in the thickness direction, the base sheets 111 may be attached on each other, or the core material layers 20 may be attached on each other.

<Third Variation>

In this variation, an adhesive core material sheet (second intermediate sheet) 60 shown in FIG. 14 is manufactured using the above-mentioned transfer sheet (first intermediate sheet) 10. In the adhesive core material sheet 60, a skin material 111 is a sheet-shaped adhesive.

In the method for manufacturing the adhesive core material sheet 60, an attaching step and a transfer step are performed in this order after the first manufacturing process described above. In the attaching step, the skin material 111 is attached to the plate-shaped flake 13 side of the transfer sheet 10 as shown in FIGS. 15(a) and 15(b). For the sheet-shaped adhesive of the skin material 111, one that has a separation sheet 141 laminated on its back side can be used.

In the transfer step, the plurality of plate-shaped flakes 13 is transferred to the skin material 111 by peeling off the base sheets 11 from the plurality of plate-shaped flakes 13 as shown in FIG. 15(c). This allows the adhesive core material sheet 60 to be obtained. The process of laminating a protective film 27 on the plate-shaped flake 13 side of the adhesive core material sheet 60 may be performed.

<Fourth Variation>

Figure 16:
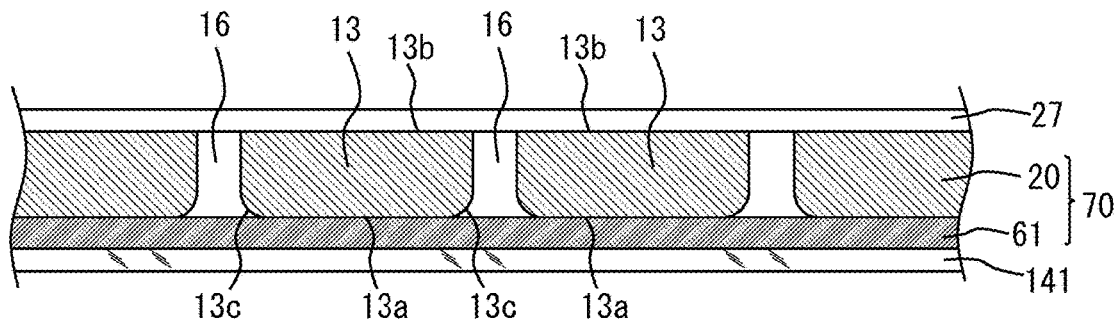
FIG. 16 shows a cross-sectional view of an adhesive core material sheet according to the fourth variation.

In this variation, the above-mentioned transfer sheet (first intermediate sheet) 10 is used to manufacture a composite manufacturing sheet (second intermediate sheet) 70 shown in FIG. 16. The composite manufacturing sheet 70 is identical with the adhesive core material sheet 60 shown in FIG. 14, except that a skin material 61 is a prepreg (in a semi-cured state). For the prepreg of the skin material 61, one that has a separation sheet 41 laminated on its back side can be used. Since a method for manufacturing a composite manufacturing sheet 160 is identical with that of the third variation except that they are different in skin material, the explanation is dispensed with.

<Fifth Variation>

Figure 17:
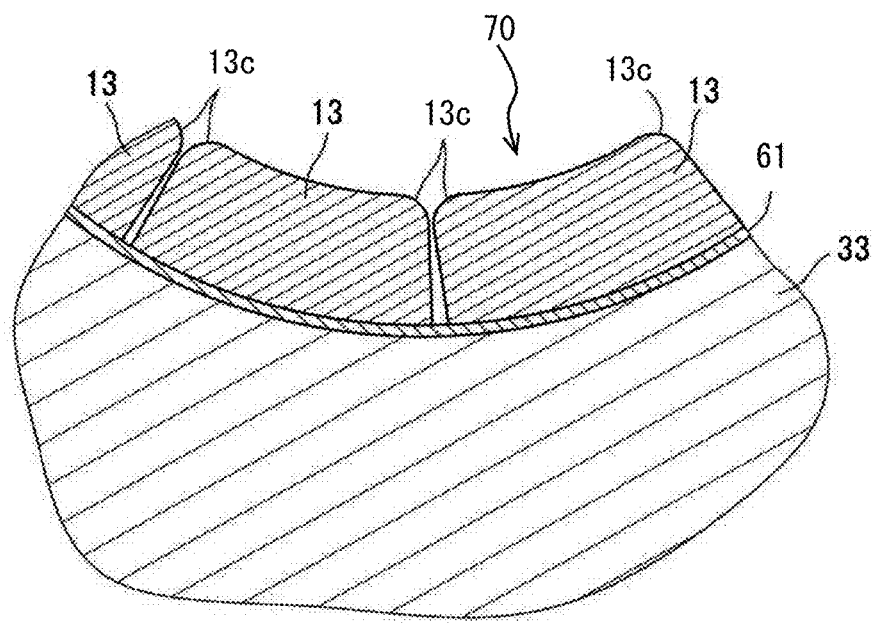
FIG. 17 shows a cross-sectional view showing a state where a base sheet (prepreg) to which a plurality of plate-shaped flakes is attached is installed on a molding die in the fifth variation.

In this variation, the intermediate sheet manufactured by the above-mentioned first manufacturing process is a composite manufacturing sheet 70 that uses a prepreg for its base sheet 61. In this case, in a method for manufacturing a composite 30, the base sheet 61 to which the plurality of plate-shaped flakes 13 is attached is installed on a molding die 33 as shown in FIG. 17. Then, a laminate 30B is fabricated by laminating the second skin material sheet 32A to the plurality of plate-shaped flakes 13 of the base sheet 61 (not shown).

The laminate 30B is heated in an autoclave at a predetermined temperature and pressure for a predetermined time, as in the above-mentioned embodiment. As a result, the laminate 30B is fired so that the composite 30 in a predetermined shape wherein the base sheet 61 and the second skin material sheet 32A are fully cure-molded is completed.

This variation makes it unnecessary to perform peeling work of the base sheet 61, and it allows the composite 30 to be manufactured through a smaller number of processes as compared with the above-mentioned embodiment.

<Sixth Variation>

Figure 18:
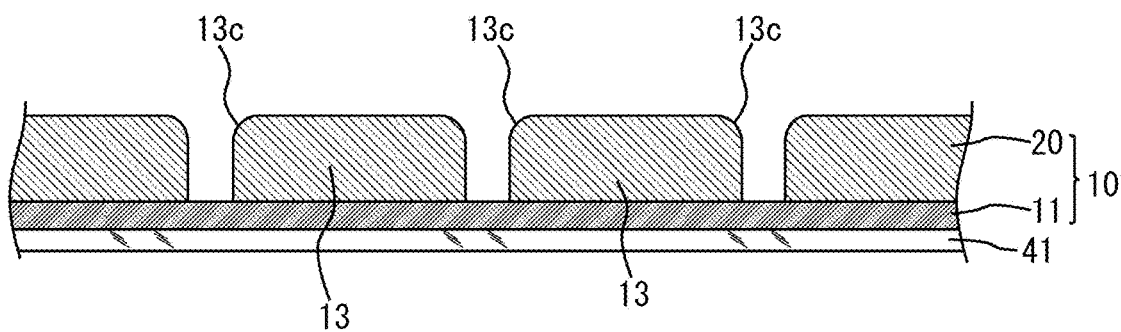
FIG. 18 shows a cross-sectional view of a laminate in the manufacturing process of a composite according to the sixth variation.

In this variation, a separation sheet 41 is laminated on the back side of the base sheet 11 in the transfer sheet 10, as shown in FIG. 18. The separation sheet 41 covers the back side of the base sheet 11.

Sheet or film materials such as, for example, polypropylene, polyolefin, polyester, polyethylene, polyethylene terephthalate, urethane, tetrafluoroethylene, polytetrafluoroethylene, polyphenylene sulfide, polyimide, polyether ether ketone, and paper can be used for a separation sheet 41.

In the case of using a prepreg for the base sheet 11, the separation sheet 41 is peelably provided on the base sheet 11 by tackiness of the adhesive property of the prepreg. Further, even in the case of using a thermoplastic resin sheet for the base sheet 11, the separation sheet 41 can be peelably provided on the base sheet 11, similarly.

In this variation, to provide the separation sheet 41 makes it easier to handle the transfer sheet 10 during the transfer step. That makes the positioning of the base sheet 11 and plate-shaped flakes 13 be easier to allow the forming work of the composite 30 to be facilitated.

<Seventh Variation>

Figure 19:
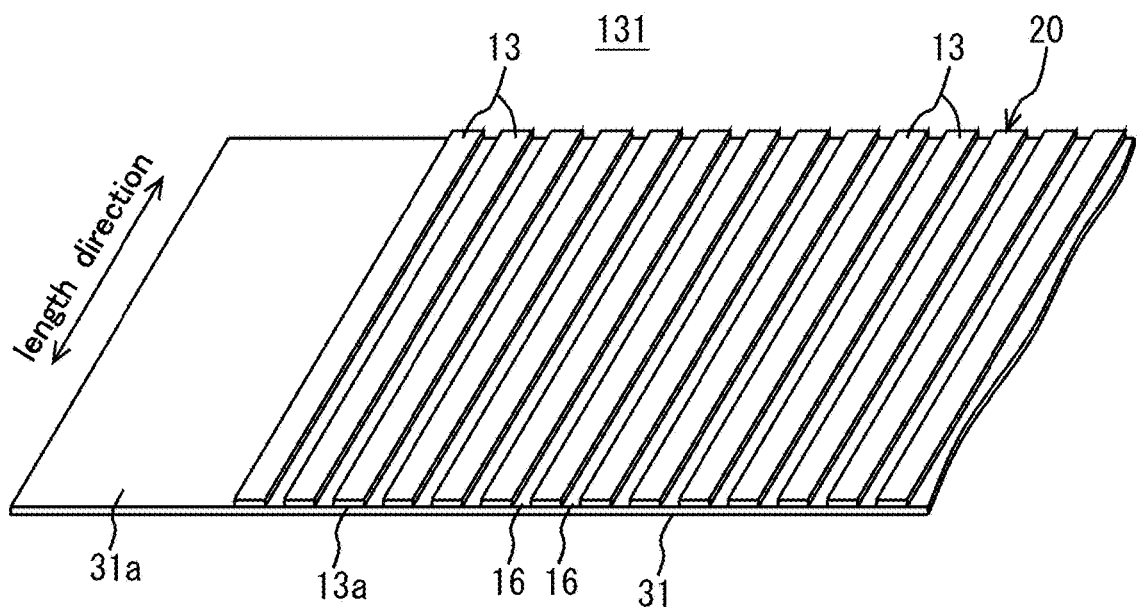
FIG. 19 shows a perspective view of a composite according to the seventh variation.

In this variation, a composite 131 is in a canapé structure, as shown in FIG. 19. Additionally, in a core material layer 20 on a skin material 31, strips of plate-shaped flakes 13 are arranged in a certain direction. A gap 16 is formed between the adjacent plate-shaped flakes 13. In FIG. 19, the plate-shaped flakes 13 are not divided in the length direction thereof, but the plate-shaped flakes 13 may be divided in the length direction thereof. In addition, a chamfered portion 13c is formed on the outer periphery of the main surface 13a on the skin material 31 side of each of the plate-shaped flakes 13, but it is left out in FIGS. 19 and 20.

Figure 20:
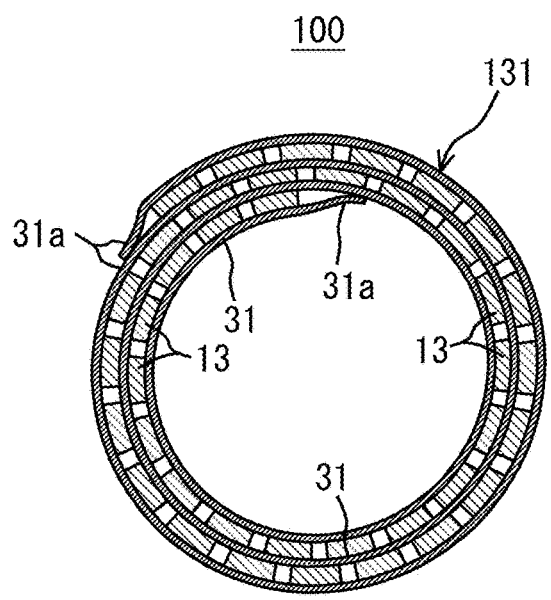
FIG. 20 shows a cross-sectional view of a cylindrical body using the composite according to the seventh variation.

A cylindrical body 100 can be produced by winding a composite 131 into a cylindrical shape. In the case where the composite 131 is wound with the skin material 31 side thereof toward the inside, the cylindrical body 100 shown in FIG. 20 is obtained. In this case, the core material layer 20 is not laminated on both end portions 31a of the skin material 31, but it is laminated so that one end portion 31a serves as an attachment site on the inner peripheral surface (an attachment location on the skin material 31 which is closer to the outside by one), and that the other end portion 13a covers the outermost plate-shaped flakes 13. The cylindrical body 100 can be obtained even in the case where the composite 131 is wound with the skin material 31 side thereof toward the outer side. In this case, one end portion 31a is laminated to cover the innermost plate-shaped flakes 13, and the other end portion 13a serves as an attachment site on the outer peripheral surface (an attachment location on the skin material 31 which is closer to the inside by one). The end portion 31a of the skin material 31 is laminated on the innermost part so as to cover a plurality of plate-shaped flakes 13.

<Eighth Variant>

In this variation, a compartment space 53 composed of a through hole is formed in each plate-shaped flake 13 of a core material layer 20. The compartment space 53 is a space which is demarcated on its periphery in a plan view. The number of the compartment spaces 53 in one plate-shaped flake 13 may be one or more. In addition, the compartment space 53 may be formed in all the plate-shaped flakes 13 or only in some of the plate-shaped flakes 13, in a composite 30.

Figure 21A:
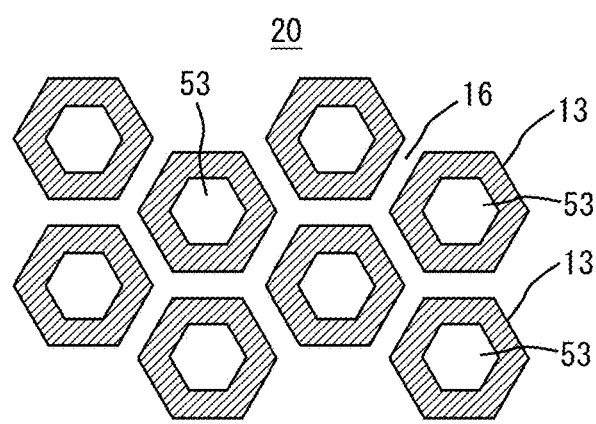
FIG. 21($a$) shows a plan view of a core material layer of a composite according to the eighth variation, and FIG. 21($b$) shows a cross-sectional view of the composite according to the eighth variation.

The peripheral shape of a plate-shaped flake 13 is a regular polygon (regular hexagon in FIG. 21(a)), as in the above-mentioned embodiment. However, the planar shape of the plate-shaped flake 13 may be a shape other than a regular polygon (e.g., a polygon other than a regular polygon, a circle, an oval, etc.). The planar shape of a compartment space 53 is identical with the peripheral shape of the plate-shaped flake 13. However, the planar shape of the compartment space 53 may be different from the peripheral shape of the plate-shaped flake 13.

Figure 21B:
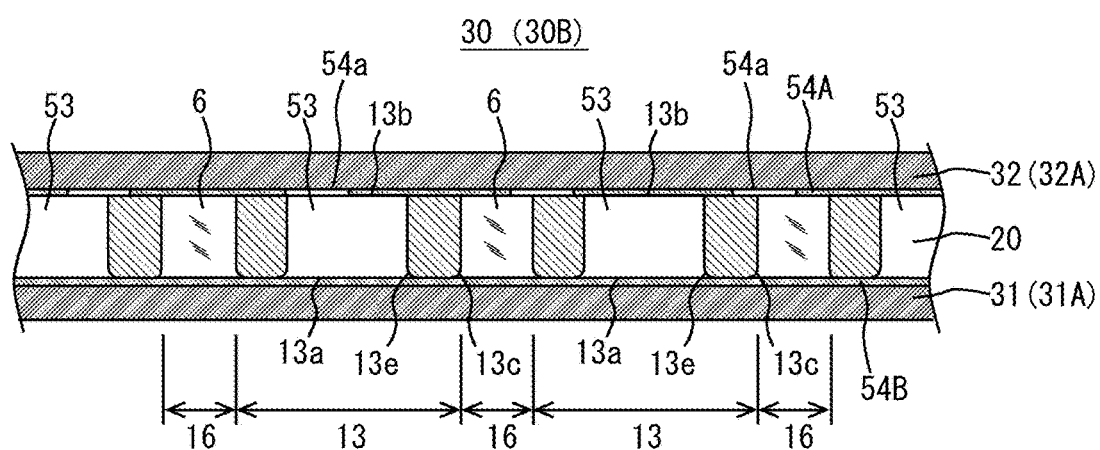

The compartment space 53 can be formed during the press cutting which divides the material sheet 14 into the plurality of plate-shaped flakes 13 in the cutting step of the first manufacturing process. In this case, in the upper die 23 used for the press cutting, a blade (not shown) corresponding to the planar shape of the compartment space 53 is provided inside the blade 24 corresponding to the planar shape of the plate-shaped flakes 13. In the composite 30, an inner chamfered portion 13e (or inner burr) is formed on the same side as the chamfered portion 13c (or burr 13d) in the thickness direction as a trace (cutting mark) indicating that the compartment space 53 has been formed by the punching process, as shown in FIG. 21(b). In FIG. 21(a), the chamfered portion 13c and the inner chamfered portion 13e are not shown. Forming the compartment space 53 in the material sheet 14, the material sheet 14 is attached to the base sheet 11 and then the material sheet 14 may be divided into the plurality of plate-shaped flakes 13 by the press cutting according to the position of the compartment space 53.

In the composite 30, the gap 16 in the core material layer 20 is filled with cured resin 6, as shown in FIG. 21(b). The resin 6 is cured one by injecting a curable resin (e.g., thermosetting type, two-component reaction type, moisture-reaction type adhesive, etc.) into the gap 16 using a pressure difference. The curable resin can be injected using, for example, the RTM (Resin Transfer Molding) method. In this case, for example, non-resin containing fiber fabric (carbon fiber or glass fiber fabric, or carbon fiber or glass fiber nonwoven fabric, etc.), a resin plate, or a metal plate can be used for skin material sheets 31A, 32A that interpose the core material layer 20, and a resin sheet 54 made of a material that does not allow curable resin to pass through can be laminated between each of the sheets 31A, 32A and the core material layer 20.

For the resin sheet 54, a perforated sheet 54A having a plurality of through holes 54A formed, or a perforation-free sheet 54B having no through holes 54a can be used. As shown in FIG. 21(b), one can be a perforated sheet 54A and the other can be a perforation-free sheet 54B, or both can be perforated sheets 54A or both can be perforation-free sheets 54B. In the case of using a perforated sheet 54A, the gap 16 is made to be easier to fill with low-fluidity curable resin by making at least some of the through holes 54A of the resin sheet 54 overlap the gap 16. Additionally, at least some of the through holes 54a of the resin sheet 54 can be made to overlap the compartment space 53, and in that case, the curable resin is injected into the compartment space 53 that overlaps the through holes 54a, and no curable resin is injected into other compartment spaces 53. In the case where none of the through holes 54a of the resin sheet 54 overlaps the compartment space 53, or in the case where both of them use a perforation-free sheet 54B, no curable resin is injected into any of the compartment spaces 53. In any case, it can be controlled whether or not to make curable resin flow into the compartment space 53. Therefore, the porosity in the core material layer 20 can be adjusted in accordance with the size of the compartment space 53. To injecting the above-mentioned curable resin into the gap 16 may not be performed. Even in this case, the provision of the compartment space 53 in each plate-shaped flake 13 makes it easier for each of plate-shaped flakes 13 to follow the three-dimensional shape.

<Ninth Variant>

Figure 22:
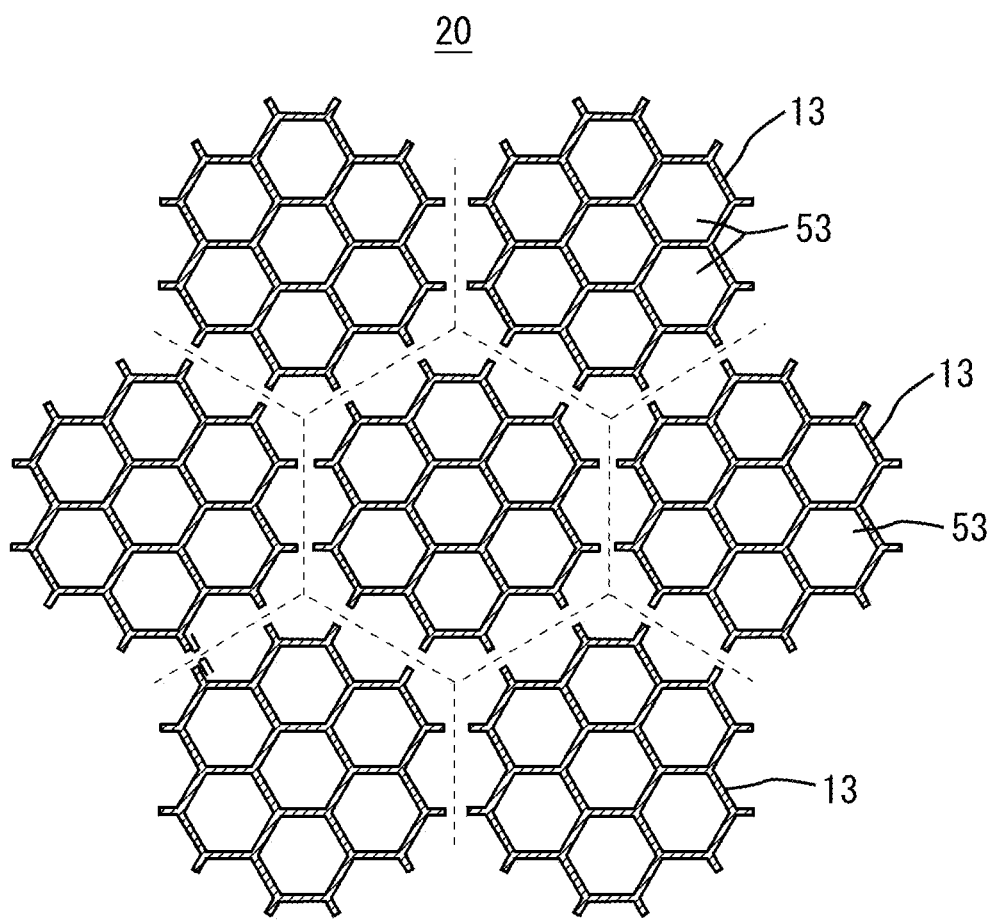
FIG. 22 shows a plan view of a core material layer of a composite according to the ninth variation.

This variation is identical with the eighth variation in that compartment spaces 53 are formed in plate-shaped flakes 13, but the plate-shaped flakes 13 have honeycomb-structured compartment spaces 53 formed, as shown in FIG. 22. The number of compartment spaces 53 in one plate-shaped flake 13 may be one or more. In FIG. 22, a dashed line represents a cutting location (the position of a press cut to be described later). The planar shape of the cutting location with respect to one plate-shaped flake 13 is polygonal (hexagonal). However, the planar shape of the cutting location may be a shape other than polygonal one.

For a manufacture of a core material layer 20, after attaching the honeycomb-structured material sheet 14 to the base sheet 11 in the above-mentioned first manufacturing process, the material sheet 14 is divided into a plurality of plate-shaped flakes 13 by performing a punching process (press cutting) on the material sheet 14 in a state of being attached to a base sheet 11. Then, the core material layer 20 is obtained by removing cutting dusts as necessary. As the material sheet 14, a material sheet wherein films are integrated with both sides of a honeycomb-structured layer so as to seal each through hole of the honeycomb structure can be used, or one that is composed solely of honeycomb-structured layer can be used.

The core material layer 20 of the eighth and ninth variations can be used in place of the core material layer 20 without the compartment space 53 in the laminates of all the above-mentioned embodiments and variations, such as the composite 30 of FIG. 2, etc., the transfer sheet 10 of FIG. 4, etc., the adhesive core material sheet 60 of FIG. 13, etc., and the composite manufacturing sheet 70 of FIG. 16, etc. To address a problem that it should be made easier for each plate-shaped flake 13 to follow a three-dimensional shape, a laminate 10 has a core material layer 20 and a skin material 11 laminated on the core material layer 20 in the case where a laminate is an intermediate sheet such as a transfer sheet 10, and the core material layer 20 has a plurality of plate-shaped flakes 13 lined up along the surface of the skin material 11. In the core material layer 20, the adjacent plate-shaped flakes 13 are separated from each other by a gap or by a cut, and a compartment space 53 is formed in the plate-shaped flakes 13. Additionally, in the case where the laminate is a composite 30 such as a sandwich-structured panel, the laminate 30 has a skin material 11 as a first skin material, and further comprises a second skin material 12 which is disposed on the side opposite to the first skin material 11 in the core material layer 20 and interposes, together with the first skin material 11, the core material layer 20. To address a problem that a laminate capable of adjusting the porosity in the core material layer 20 should be realized, in the laminates 10, 30 a resin sheet 54 which is impermeable to a curable resin, laminated between each of the skin material sheets 31A, 32A and the core material layer 20.

<Tenth Variant>

In this variation, a holding portion 80 is laminated on the main surfaces 13a, 13b of the plate-shaped flake 13 of the core material layer 20 to hold the planar position of the plate-shaped flake 13. The holding portion 80 is a pressure-sensitive adhesive layer or an adhesive layer having a gap formed partially.

Figure 23A:
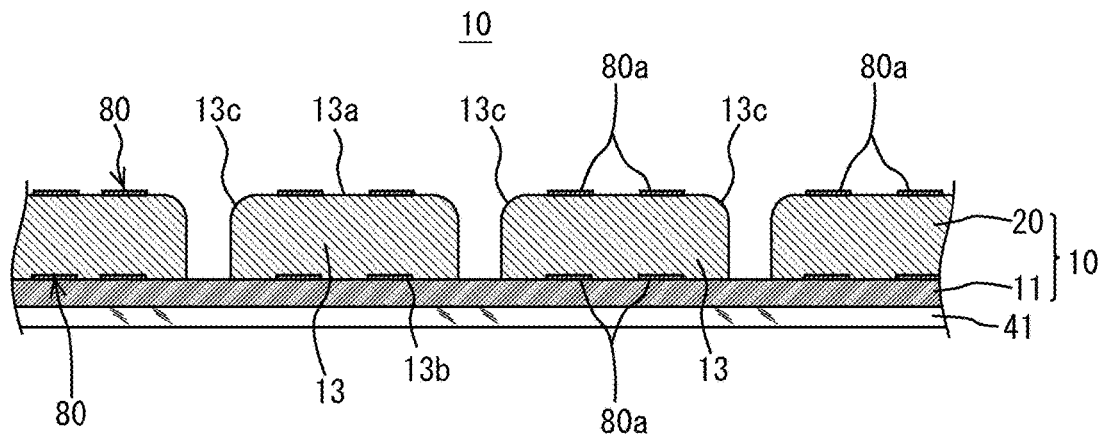
FIG. 23($a$) shows a cross-sectional view of a transfer sheet according to the tenth variation, FIG. 23($b$) shows a cross-sectional view of a composite according to the tenth variation, and FIG. 23($c$) shows a plan view showing a state where dot portion side of a transfer sheet for forming a pressure-sensitive adhesive layer overlaps plate-shaped flakes in the process of manufacturing the transfer sheet according to the tenth variation.
Figure 23B:
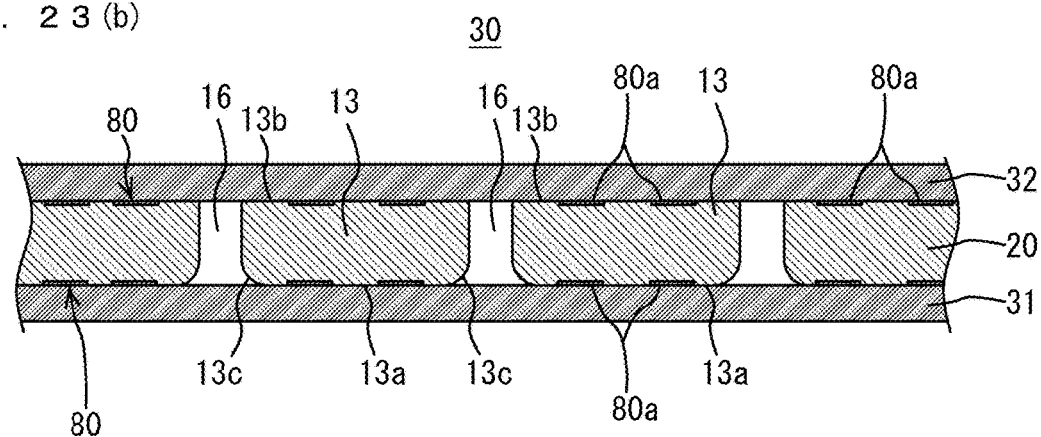

In FIG. 23, a pressure-sensitive adhesive layer 80 is composed of a plurality of dot portions 80a, each of which is composed of a thin film of a pressure-sensitive adhesive. In the pressure-sensitive adhesive layer 80, for example, the plurality of dot portions 80a is regularly arranged. The pressure-sensitive adhesive layer 80 is laminated on at least one of the main surface 13a and the main surface 13b of the plate-shaped flake 13. In the transfer sheet 10 of FIG. 23(a) and the composite 30 of FIG. 23(b), the pressure-sensitive adhesive layer 80 is laminated on both the main surface 13a and the main surface 13b of the plate-shaped flake 13. However, the pressure-sensitive adhesive layer 80 may be laminated only on the main surface 13a of the plate-shaped flake 13 or only on the main surface 13b of the plate-shaped flake 13. This variation can suppress plate-shaped flakes 13 from deviating positionally at the time of injecting curable resin into the gap 16 using a pressure difference, and can suppress the plate-shaped flakes 13 from deviating positionally even in the finished product of the composite 30.

As a method of providing the pressure-sensitive adhesive layer 80 on plate-shaped flakes 13, it is thought of, for example, to print a plurality of dot portions 80a on one or both sides of the material sheet 14, which is a material of the core material layer 20, in a preparation process performed prior to the first manufacturing process. In this case, in the first manufacturing process, the material sheet 14 on which the plurality of dot portions 80a is printed is attached to a base sheet 11, and then the material sheet 14 is divided into the plurality of plate-shaped flakes 13 by the punching processing.

Figure 23C:
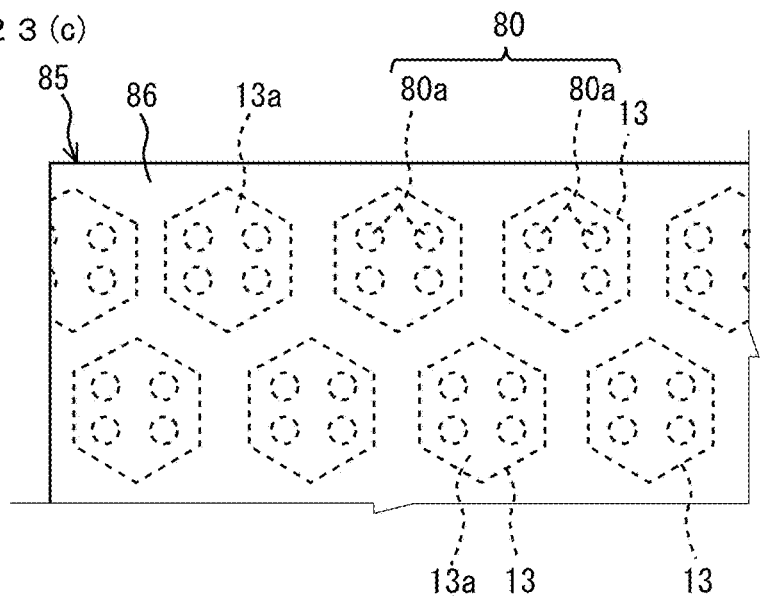

As another method, a transfer sheet 85 for forming a pressure-sensitive adhesive layer, on which the plurality of dot portions 80a is printed, can be used (see FIG. 23(c)). In this case, an easily peelable sheet, such as a resin sheet of PET film with silicone treatment, can be used for the base sheet 86, out of the transfer sheet 85, on which the plurality of dot portions 80a is printed. The adhesive strength of the dot portion 80a to the plate-shaped flake 13 is greater than the adhesive strength of the dot portion 80a to the base sheet 86. In this method, after the cutting step in the first manufacturing process, the dot portion 80a side of the transfer sheet 85 is placed on the main surface 13a of the plate-shaped flake 13 (the state shown in FIG. 23(c)). Then, by peeling off the base sheet 86, the plurality of dot portions 80a can be transferred to the main surface 13a of the plate-shaped flake 13. Instead of printing the plurality of dot portions 80a on the material sheet 14 in the above-mentioned preparation process, the plurality of dot portions 80a may be transferred to the main surfaces 13a, 13b of the plate-shaped flake 13 using the transfer sheet 85.

The dot portions 80a may be composed of a thin film of adhesive instead of an adhesive. In this case, the dot portions 80a adhered to each plate-shaped flake 13 can serve as anchors, thereby suppressing misalignment of the plate-shaped flake 13.

Figure 24:
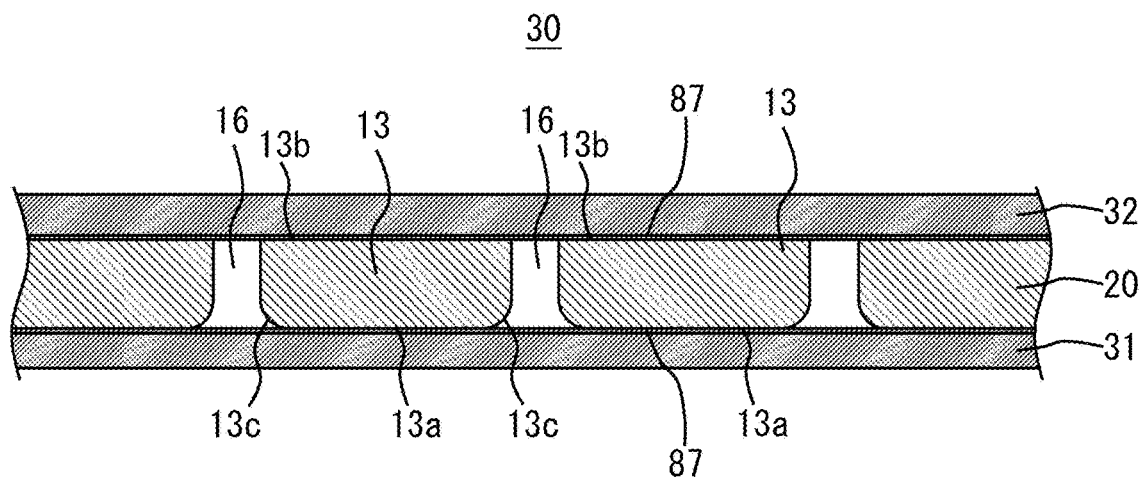
FIG. 24 shows a cross-sectional view of another composite according to the tenth variation.

Additionally, instead of the plurality of dot portions 80a, an adhesive sheet (or an adhesive sheet) 87 having a plurality of gaps formed direction may be laminated with respect to the main surfaces 13a, 13b of the plate-shaped flake 13 in the thickness, as shown in FIG. 24. For the adhesive sheet 87, a mesh sheet obtained by using a pressure-sensitive adhesive as a material, or a non-woven fabric obtained by having fibers as a pressure-sensitive adhesive intertwined can be used. For the adhesive sheet 87, a mesh sheet obtained by using an adhesive as a material, or a non-woven fabric obtained by having fibers as an adhesive intertwined can be used. In these cases, too, the plate-shaped flakes 13 can be suppressed from deviating positionally.

The holding portion 80 of this variation can be applied to the laminates of all the above-mentioned embodiments and variations, such as the composite 30 of FIG. 2, etc., the transfer sheet 10 of FIG. 4, etc., the adhering core material sheet 60 of FIG. 13, etc., and the composite manufacturing sheet 70 of FIG. 16, etc., and like. To address a problem that a laminate capable of suppressing the positional deviation of plate-shaped flakes 13 should be realized, a laminate 10 has a core material layer 20 and a skin material 11 laminated on the core material layer 20 in the case where the laminate is an intermediate sheet such as a transfer sheet 10, the core material layer 20 has a plurality of plate-shaped flakes 13 lined up along the surface of the skin material 11, and in the core material layer 20, adjacent plate-shaped flakes 13 are separated from each other by a gap or by a cut, and a holding portion 80 is laminated between the skin material 11 and the plate-shaped flakes 13 to hold the planar position of the plate-shaped flakes 13. Additionally, in the case where the laminate is a composite 30 such as a sandwich-structured panel, a laminate 30 has a skin material 11 as a first skin material and further comprises a second skin material 12 that is disposed on the side opposite to the first skin material 11 in the core material layer 20 and interposes, together with the first skin material 11, the core material layer 20, and the holding portion 80 is laminated between the skin materials 11, 12 and the plate-shaped flake 13.

<Eleventh Variant>

In this variation, an elastic sheet material is used for the base sheet 11 of the transfer sheet 10. A resin sheet such as CPP film (cast polypropylene) for example can be used for the base sheet 11. An example of physical property values of the base sheet 11 is, for example, a tensile strength of 100 MPa (JIS K 7127) or less and a tensile elongation of 200% (JIS K 7127) or more.

Figure 25:
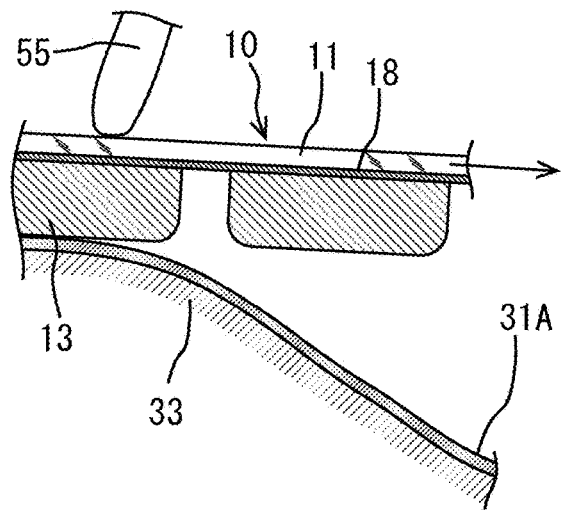
FIG. 25 shows a cross-sectional view when transferring a plate-shaped flake by using a transfer sheet according to the eleventh variation.

In this variation, the transfer of plate-shaped flakes 13 to the skin material sheet 31A is performed in the transfer step of transferring the plate-shaped flake 13 by pressing a plate-shaped flake 13 of transfer target from the back side of the base sheet 11 with a member such as a rod or a pressing object 55 such as a finger of a worker, while pulling the base sheet 11 by the worker or a machine in a direction of an arrow shown in FIG. 25. This variation makes the plate-shaped flake 13 be easy to transfer since the adhesive force between the plate-shaped flake 13 of transfer target and the base sheet 11 is reduced by pulling the base sheet 11. For example, during being transferred to the skin material sheet 31A placed on a convex curved surface, the plate-shaped flake 13 is easy to transfer since the adhesion area of the plate-shaped flake 13 to the skin material sheet 31A is reduced.

<Other Variations>

Figure 26A:
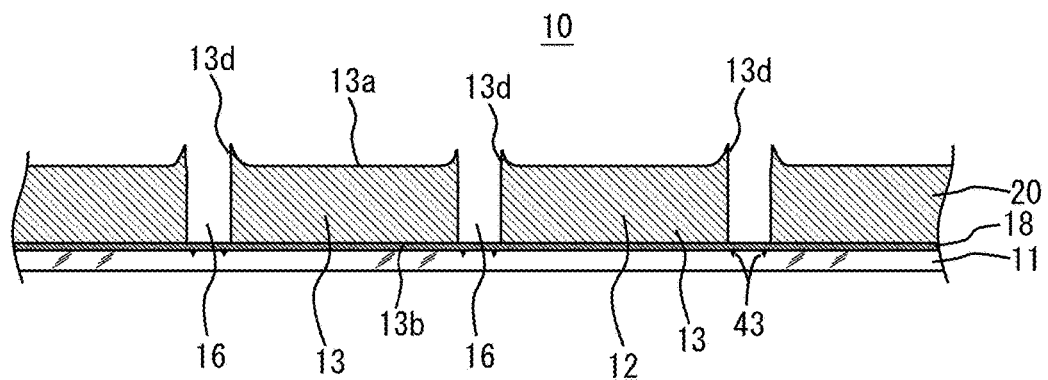
FIG. 26($a$) shows a cross-sectional view of a transfer sheets according to other variations, and FIG. 26($b$) shows a cross-sectional view of a composite according to other variations.
Figure 26B:
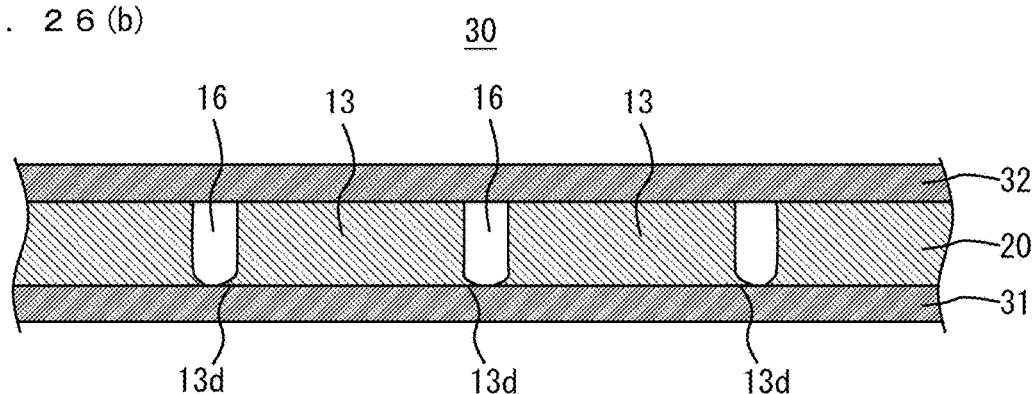

In the above-mentioned embodiment, the material sheet 14 may be cut and divided into the plurality of plate-shaped flakes 13 by laser cutting instead of press cutting. In this case, an intermediate sheet 10 has burrs 13d formed, on the outer periphery of the main surface 13a of each plate-shaped flake 13, as cutting marks that allows the cutting direction along the thickness direction to be identified, as shown in FIG. 26(a). As shown in FIG. 26(b), burrs 13d are also left on the outer periphery of the main surface 13a of each plate-shaped flake 13 even in the composite 30. Even in the case of laser cutting, chamfered portions 13c are formed on the outer periphery of the main surface 13a of each plate-shaped flake 13 as the above-mentioned cutting marks, in some cases. Additionally, the condition of the cut surface can be controlled by adjusting the focus and output of the laser, or feed speed, during laser cutting.

In the above-mentioned embodiment, the material sheet 14 may be divided into the plurality of plate-shaped flakes 13 by cutting it by using a cutting device (cutting plotter) that moves a blade along a shape to be cut, instead of press cutting or laser cutting. In this case, too, chamfered portions 13c or burrs 13d are formed on the outer periphery of the main surface 13a of each plate-shaped flake 13 as cutting marks that allows the cutting direction along the thickness direction to be identified.

Figure 27:
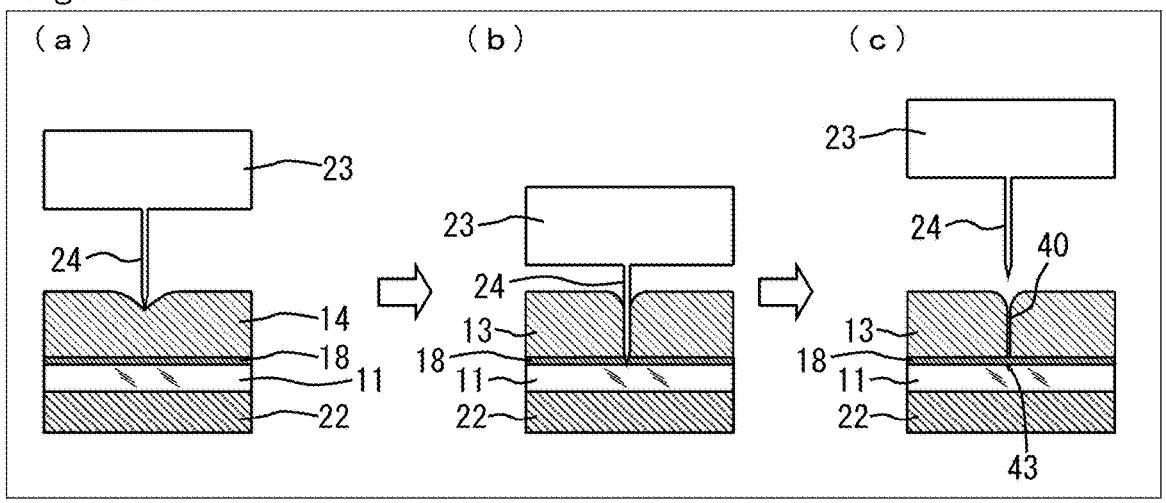
FIG. 27 shows a cross-sectional view to explain how a cut is formed between adjacent plate-shaped flakes during press cutting in the first manufacturing process, in a composite according to other variations.

In the above-mentioned embodiment, adjacent plate-shaped flakes 13 are separated from each other by the gap 16 in the core material layer 20, but the adjacent plate-shaped flakes 13 may be separated by a cut 40. In this case, as shown in FIGS. 27(a) and 27(b), adjacent plate-shaped flakes 13 are cut by the same blade 24. For example, in the case of forming a regular hexagonal plate-shaped flake 13, a blade 24 with a regular hexagonal arrangement pattern is used. As shown in FIG. 27(c), when the blade 24 is pulled out, the plate-shaped flake 13 which was elastically deformed in the state of FIG. 27(b) is restored, and the cut 40 is left between the adjacent plate-shaped flakes 13.

In the above-mentioned embodiment, a metallic material may be used as a material of the skin materials 31, 32. In this case, each plate-shaped flake 13 is adhered to the skin materials 31, 32 by an adhesive. As this adhesive, for example, a vinyl acetal/phenol resin adhesive, a nitrile rubber/phenol resin adhesive, a chloroprene rubber/phenol resin adhesive, an epoxy adhesive, a recycled rubber adhesive, a polybenzimitazole (PBI) adhesive, a polyimide (PI) adhesive and the like can be used. From the viewpoint of improving the efficiency of the adhering process (the stability of the amount of adhesive applied and workability), a sheet-shaped adhesive (film-shaped adhesive) may be used. The base resin of this sheet-type adhesive is, for example, epoxy, nylon/epoxy, nitrile/epoxy, acrylic/epoxy, vinyl/epoxy, modified epoxy, epoxy/phenolic, polyimide, nylon, or modified polypropylene.

In the above-mentioned embodiment, the size of plate-shaped flakes 13 will be larger, and the width W of gaps 16 between adjacent plate-shaped flakes 13 also will be larger in the case where the composite 30 is used in a huge structure such as a hull panel. For example, in the case where the external shape of the plate-shaped flake 13 is a deformed circle whose major axis dimension is 100 mm, the width W of the gap 16 may be 10 mm or more.

In the above-mentioned embodiment, all the plate-shaped flakes 13 in a core material layer 20 need not be identical in shape. For example, in accordance with the curvature of a part in a composite 30, the planar shape of a plate-shaped flake 13 in the part may be determined.

In the above-mentioned embodiment, the composite 30 shown in FIG. 2 may be formed in a canapé structure by dispensing with the second skin material 32. In this case, the plate-shaped flake 13 side of the composite 30 is attached to the structural material to be reinforced. The core material layer 20 is interposed between the first skin material 31 and the structural material to be reinforced.

In the above-mentioned embodiment, the core material layer 20 is composed of the plurality of plate-shaped flakes 13 lined up along the surface of the skin materials 11, 12. However, in intermediate sheet such as the transfer sheet 10, the adhering core material sheet 60, and the composite manufacturing sheet 70, the core material layer 20 may be composed of a sheet material having a plurality of through holes formed (e.g., a honeycomb-structured sheet material).

Example

An example of the composite 30 in the structure shown in FIGS. 1 and 2 will be described. The present disclosure is not limited to this example unless it goes beyond its main purpose. In addition, unless otherwise stated, the units and measurement methods described in this example are in accordance with JIS standards.

For a material of the plate-shaped flake 13, a material whose product name is "ROHACELL (registered trademark)" (EVONIK Industries AG) was used as a polymethacrylimide (PMI) closed cell foam. The density of the plate-shaped flake 13 was 110 kg/m3. Additionally, the planar shape of the plate-shaped flake 13 was, as its basis shape, made to be a regular hexagon, each of whose six corners was chamfered. The dimensions of the plate-shaped flake 13 were 1.0 mm in thickness, 5 mm in length of one side of the regular hexagon, and 0.5 mm in radius of the above-mentioned chamfer of each corner. Width W of the gap 16 between adjacent plate-shaped flakes 13 was 1 mm. A plurality of plate-shaped flakes 13 was uniformly arranged in the above-mentioned honeycomb arrangement. As cutting marks of the punching process, the chamfered portions 13c whose radius is about 0.05 mm were formed on the outer periphery of the main surface (one surface) 13a of the plate-shaped flakes 13. The ratio R1 of the area of the plate-shaped flakes 13 to the whole area in a plan view was 80.3% (a calculated value reflecting the reduction in area due to the chamfering of each corner).

For the materials of the skin materials 31, 32, a material whose product name is "Pyrofil Prepreg (registered trademark) TR3110 381GMX" (manufactured by Mitsubishi Chemical Corporation) was used as a prepreg. The specifications of this prepreg were those of a plainly woven cloth material made of carbon fiber which was 333 g/m2 in total basis weight and 240 GPa in tensile modulus, and the matrix thereof was a thermosetting epoxy resin.

In the heating step, the laminate 30B was heated at 0.2 MPa and 130° C. for 2 hours. As a result, the composite 30 which was 1.49 mm in thickness and 503 kg/m3 in density was formed.

To evaluate the physical properties of this composite 30, a flexural test was conducted in accordance with JIS standard K7074 (the flexural test method for carbon fiber reinforced plastics). As a result, the flexural modulus was 18.9 GPa and the density was 503 kg/m3, and the modulus per density took on a very high value. The embodiment has allowed it to be ensured that a lightweight and highly rigid composite 30 can be obtained.

INDUSTRIAL APPLICABILITY

The present disclosure can be applied to a composite having a core material layer, and the like.

DESCRIPTION OF REFERENCE CHARACTERS

10 Transfer sheet (laminate, intermediate sheet)
11 Base sheet (skin material)
13 Plate-shaped flake
13a, 13b Main surface
13c Chamfered portion
13d Burr
16 Gap
18 Pressure-sensitive adhesive layer
20 Core material layer
30 Composite (laminate)
31, 32 Skin material
40 Cut
60 Adhering core material sheet (laminate, intermediate sheet)
70 Composite manufacturing sheet (laminate, intermediate sheet)

The invention claimed is:

1. A method of manufacturing an intermediate sheet, the method comprising:
cutting a material sheet of a laminate in which the material sheet is attached to a base sheet by a removable-type pressure-sensitive adhesive, into a plurality of plate-shaped flakes without dividing the base sheet, thereby producing the intermediate sheet that includes the base sheet and the plurality of plate-shaped flakes attached to the base sheet by the removable-type pressure-sensitive adhesive; and wherein the intermediate sheet is used as a transfer sheet, wherein the plurality of plate-shaped flakes is transferred from the base sheet to another structural material,
an attaching step of attaching a prepreg as a skin material of the intermediate sheet, to the plate-shaped flake side of the transfer sheet, and
a transfer step of transferring, after the attaching step, the plurality of plate-shaped flakes to the skin material of the intermediate sheet by peeling off the base sheet from the plurality of plate-shaped flakes.

2. A method for manufacturing a composite, the method comprising:
cutting a material sheet of a laminate in which the material sheet is attached to a base sheet by a removable-type pressure-sensitive adhesive, into a plurality of plate-shaped flakes without dividing the base sheet, thereby producing the intermediate sheet that includes the base sheet and the plurality of plate-shaped flakes attached to the base sheet by the removable-type pressure-sensitive adhesive; and wherein the intermediate sheet is used as a transfer sheet, wherein the plurality of plate-shaped flakes is transferred from the base sheet to another structural material,
an attaching step of attaching a prepreg to the plate-shaped flake side of the transfer sheet, and
a transfer step of transferring, after the attaching step, the plurality of plate-shaped flakes to the prepreg by peeling off the base sheet from the plurality of plate-shaped flakes.

3. The method for manufacturing a composite according to claim 2,
wherein:
an elastic sheet is used for the base sheet; and
in the transfer step, the plate-shaped flakes are transferred by pressing a plate-shaped flake from a back side of the base sheet while pulling the base sheet.

4. The method for manufacturing a composite according to claim 2, the method further comprising:
a lamination step of interposing, after the transfer step, the plurality of plate-shaped flakes between the prepreg and a second prepreg, thereby producing a second laminate that the plurality of plate-shaped flakes is provided as a core material layer; and
a honeycomb formation step of forming a honeycomb structure made of resin in the core material layer, including the plurality of plate-shaped flakes, by making resin contained in the prepreg or the second prepreg flow into a gap between adjacent plate-shaped flakes in the core material layer to cure the resin.

5. A method of manufacturing an intermediate sheet, the method comprising:
cutting only one material sheet of a laminate in which the one material sheet is attached to a base sheet by a removable-type pressure-sensitive adhesive, into a plurality of plate-shaped flakes without dividing the base sheet, thereby producing the intermediate sheet that includes the base sheet and the plurality of plate-shaped flakes attached to the base sheet by the removable-type pressure-sensitive adhesive; and
wherein during the cutting, the laminate is placed on a lower mold so that the base sheet faces the lower mold side, and
wherein the intermediate sheet is used (i) as a transfer sheet, wherein the plurality of plate-shaped flakes is transferred from the base sheet to another structural material, or (ii) as an adhering core material sheet, wherein the base sheet is allowed to be melted in a state of being sandwiched between two sheets.

6. A method for manufacturing a composite, the method comprising:
cutting a material sheet of a laminate in which the material sheet is attached to a base sheet by a removable-type pressure-sensitive adhesive, into a plurality of plate-shaped flakes without dividing the base sheet, thereby producing a transfer sheet that includes the base sheet and the plurality of plate-shaped flakes attached to the base sheet by the removable-type pressure-sensitive adhesive,
an attaching step of attaching a prepreg to the plate-shaped flake side of the transfer sheet, and
a transfer step of transferring, after the attaching step, the plurality of plate-shaped flakes to the prepreg by peeling off the base sheet from the plurality of plate-shaped flakes.

7. A method for manufacturing a composite, the method comprising:
cutting a material sheet of a laminate in which the material sheet is attached to a base sheet by a removable-type pressure-sensitive adhesive, into a plurality of plate-shaped flakes without dividing the base sheet, thereby producing the intermediate sheet that includes the base sheet and the plurality of plate-shaped flakes attached to the base sheet by the removable-type pressure-sensitive adhesive; and wherein the intermediate sheet is used as an adhering core material sheet, wherein the base sheet is allowed to be melted in a state of being sandwiched between two sheets, a melting step of melting the base sheet included in the adhering core material sheet to join the two sheets together.

\* \* \* \* \*